US011792756B2

(12) United States Patent
Venugopal et al.

(10) Patent No.: US 11,792,756 B2
(45) Date of Patent: Oct. 17, 2023

(54) TECHNIQUES FOR CHANNEL MEASUREMENT AND REPORTING FOR LOWER LAYER MOBILITY

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/518,039

(22) Filed: Nov. 3, 2021

(65) Prior Publication Data

US 2022/0225249 A1 Jul. 14, 2022

Related U.S. Application Data

(60) Provisional application No. 63/136,859, filed on Jan. 13, 2021.

(51) Int. Cl.
*H04W 56/00* (2009.01)
(52) U.S. Cl.
CPC .................. *H04W 56/001* (2013.01)

(58) Field of Classification Search
CPC ... H04W 56/001; H04L 5/0048; H04L 5/0094
See application file for complete search history.

(56) References Cited

U.S. PATENT DOCUMENTS

| 2020/0413309 | A1* | 12/2020 | Zhu ................. | H04W 36/00835 |
| 2021/0068092 | A1* | 3/2021 | Abedini ............ | H04W 56/0075 |
| 2022/0346047 | A1* | 10/2022 | Takeda ............. | H04W 56/0015 |

* cited by examiner

*Primary Examiner* — Kyaw Z Soe
(74) *Attorney, Agent, or Firm* — Holland & Hart LLP

(57) ABSTRACT

Methods, systems, and devices for wireless communications are described. A user equipment (UE) may receive, from a serving base station, a message indicating a set of synchronization signal block (SSB) resources for synchronization signal transmission by the serving base station and by one or more neighbor base stations. The SSB resources may include a first portion of resources associated with the serving base station and additional portions of resources associated with the one or more neighbor base stations. The UE may identify two or more symbols which are adjacent to consecutive SSB resources of the set of SSB resources, and exclude the two or more symbols from being used for communications between the UE and the serving base station based on the two or more symbols being adjacent to consecutive SSB resources. The UE may communicate with the serving base station on symbols other than the two or more symbols.

30 Claims, 15 Drawing Sheets

TECHNIQUES FOR CHANNEL MEASUREMENT AND REPORTING FOR LOWER LAYER MOBILITY

CROSS REFERENCE

The present application for patent claims the benefit of U.S. Provisional Patent Application No. 63/136,859 by VENUGOPAL et al., entitled "TECHNIQUES FOR CHANNEL MEASUREMENT AND REPORTING FOR LOWER LAYER MOBILITY," filed Jan. 13, 2021, assigned to the assignee hereof, and expressly incorporated by reference herein.

FIELD OF TECHNOLOGY

The following relates to wireless communications, including techniques for channel measurement and reporting for lower layer mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured for lower layer mobility, such as Layer 1 (L1)/Layer 2 (L2) mobility, where the UE may perform lower layer handover procedures so that the UE may dynamically perform a handover procedure to a neighboring base station. To support such lower layer mobility, a UE may be configured to monitor for one or more transmissions, such as synchronization signal block (SSB) transmissions, from one or more base stations to determine whether to perform a handover procedure. Conventional methods for configuring a UE to monitor for the one or more SSB transmissions may be improved.

SUMMARY

The described techniques relate to improved methods, systems, devices, and apparatuses that support techniques for channel measurement and reporting for lower layer mobility. Generally, the described techniques provide for enhanced methods for a user equipment (UE) to monitor for transmissions from one or more base stations to perform channel measurements and to determine whether to perform a handover procedure. A UE may receive, from a serving base station, a message indicating a set of synchronization signal block (SSB) resources reserved for synchronization signal transmission by the serving base station and by one or more neighbor base stations. The set of SSB resources may include a first portion of resources associated with the serving base station and one or more additional portions of resources associated with respective ones of the one or more neighbor base stations. The UE may identify two or more symbols which are adjacent to consecutive SSB resources of the set of SSB resources. The UE may exclude the two or more symbols from being used for communications between the UE and the serving base station based on the two or more symbols being adjacent to consecutive SSB resources. In some cases, the UE may be configured to exclude the set of SSB resources or a subset of the set of SSB resources from being used for communications between the UE and the serving base station. The UE may exclude the two or more symbols and/or the set or subset of SSB resources so as to mitigate interference between SSB transmissions and communications between the UE and the serving base station. The UE may communicate with the serving base station on resources other than the resources being excluded. As interference to SSB transmissions during the set or subset of SSB resources may be mitigated, the UE may reliably perform channel quality measurements on one or more received SSB transmissions from the serving base station and/or from one or more neighboring base stations to determine whether to perform a handover procedure with a neighboring base station. In some cases, as the UE may receive an indication of the set of SSB resources, the UE may perform SSB measurements (e.g., lower layer, such as Layer 1 (L1) measurements) and report the SSB measurements based on the set of SSB resources, even if the UE 115 has not received an indication that a certain SSB resource or SSB transmission is configured for channel measurement reporting (e.g., L1 reporting). In some implementations, the UE may be configured to report SSB measurements based on an event (e.g., an A1, A2, A3 trigger), rather than the SSB being configured for lower layer-based measurement and reporting.

DETAILED DESCRIPTION

Figure 1:
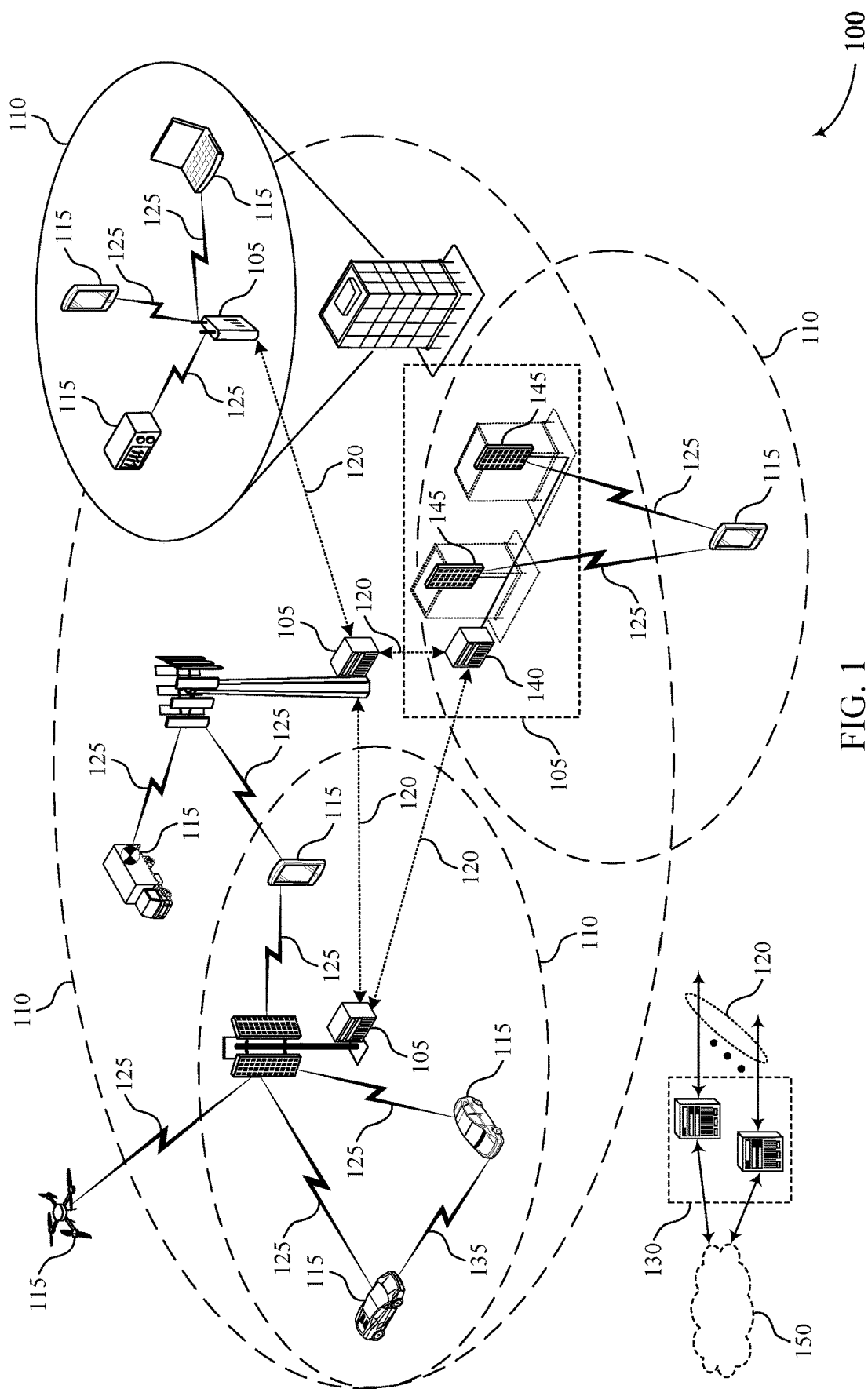
FIG. 1 illustrates an example of a wireless communications system that supports techniques for channel measurement and reporting for lower layer mobility in accordance with aspects of the present disclosure.

In some wireless communications systems, a user equipment (UE) may be configured to monitor for one or more downlink transmissions from a serving base station of the UE. The UE may receive an indication of a set of resources over which to monitor for the one or more downlink transmissions. For example, the UE may receive an indication of a set of synchronization signal block (SSB) resources, during which the serving base station may transmit SSB transmissions over one or more beams in a beam sweeping manner. In some cases, the UE may be configured to refrain from transmitting or receiving transmissions, such as data transmissions, during such SSB resources, and during one symbol before and one symbol after each SSB resource. As the UE may refrain from communications during such SSB resources, the UE may reliably monitor for, receive, and measure SSB transmissions from the serving base station without interference. The UE may measure received SSB transmissions from the serving base station and transmit a report to the serving base station that may indicate the one or more measurements, or indicate to the base station a beam (e.g., a preferred beam) to use for communications with the UE.

In some implementations, the UE may be configured to monitor for SSB transmissions from one or more neighboring base stations that the UE may measure to determine whether to perform a handover procedure to a neighboring base station. For example, a UE may be a highly mobile device and/or may be located in a highly mobile wireless communications system. As such, a UE may benefit from an efficient handover procedure. Therefore, a UE may be configured to perform lower layer mobility (e.g., Layer 1 (L1)/Layer 2 (L2) mobility). An example of lower layer mobility may be a UE performing a lower layer handover procedure (e.g., L1/L2 handover procedure) to a neighboring base station. A lower layer handover procedure may be more efficient, and allow for a more dynamic handover of a UE from a serving base station to a neighbor base station. If a UE is configured to perform lower layer mobility, a UE may monitor and measure SSBs from the serving base station of the UE, or from neighbor base stations (e.g., base stations nearby the UE), or both. In some cases, a UE may not receive an indication of the SSB resources being used by the one or more neighbor base stations for SSB transmissions and/or the UE may not be configured to refrain from transmitting or receiving transmissions, such as data transmissions, during the neighboring base stations SSB resources. As such, the UE may attempt to communicate, such as with the serving base station of the UE, during such SSB resources. A neighboring base station may transmit an SSB transmission in the same duration (e.g., symbol, slot, transmission time interval (TTI)) that the UE may attempt to communicate. Thus, the UEs communication attempt may interfere with the UEs ability to receive and measure the SSB transmission from the neighboring station which may interfere with the ability of the UE to perform a lower layer handover procedure with the neighboring base station.

To mitigate interference at a UE and to improve procedures associated with lower layer mobility, such as lower layer handover procedures, a UE may receive an indication of a set of SSB resources (e.g., time and frequency resources during which an SSB may be transmitted), where the set of resources may include SSB resources used by the serving base station and SSB resources used by one or more neighboring base stations of the UE. In some cases, the UE may be configured to refrain from communicating during each resource included in the set of SSB resources. The UE may refrain from transmitting a number of time resources before (e.g., one symbol) and a number of time resources after (e.g., one symbol) each set of consecutive SSB resources in the set of SSB resources. In some implementations, the UE may receive an indication of a subset of the set of SSB resources and the UE may refrain from communicating during each resource included in the subset (rather than the set). The UE may refrain from transmitting a number of time resources before (e.g., one symbol) and a number of time resources after (e.g., one symbol) each set of consecutive SSB resources in the subset of SSB resources. As the UE may refrain from communicating during the set or subset of SSB resources, the UE may reliably monitor for SSB transmissions from the serving base station and/or from the one or more neighboring base stations. In some implementations, the UE may monitor for SSB transmissions during the set or subset of SSB resources and measure one or more received SSB transmissions. For example, the UE may measure the quality (e.g., reference signal received quality (RSRQ)), power (e.g., reference signal received power (RSRP)), etc. of the one or more received SSB transmissions to determine the beam (e.g., a preferred beam) over which the UE receives a highest (or high) power and/or quality signal. The UE may transmit a measurement report for one or more of the received SSB transmissions, such as one or more SSB transmissions with the highest measurements (e.g., highest quality, highest power), where the reported SSB measurements may be associated with SSB transmissions from the serving base station, or one or more neighboring base stations.

In some implementations, a UE may be configured to measure and transmit a measurement report for SSB transmissions in SSB resources that are configured for lower layer (e.g., L1) reporting, and SSB transmissions in SSB resources that are not configured for lower layer (e.g., L1) reporting. For example, if the SSB resource is included in the set or subset, even if the UE has not received an indication that a certain SSB resource or SSB transmission is configured for L1 reporting, the UE may perform L1-based measurements and report the L1-based measurements (e.g., autonomously). In some implementations, the UE 115 may be configured to report SSB measurements based on an event (e.g., an A1, A2, A3 trigger), rather than the SSB being configured for lower layer-based measurement and reporting.

Particular aspects of the subject matter described herein may be implemented to realize one or more advantages. The described techniques may support improvements in monitoring for SSB transmissions and reporting SSB measurements for performing lower layer handover procedures. Such techniques may support improving reliability and efficiency, and decreasing latency, among other advantages. As such, supported techniques may include improved network operations and, in some examples, may promote network efficiencies, among other benefits.

Aspects of the disclosure are initially described in the context of wireless communications systems. Aspects are then described with reference to a process flow. Aspects of the disclosure are further illustrated by and described with reference to apparatus diagrams, system diagrams, and flowcharts that relate to techniques for channel measurement and reporting for lower layer mobility.

FIG. 1 illustrates an example of a wireless communications system 100 that supports techniques for channel measurement and reporting for lower layer mobility in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured to perform lower layer mobility such as lower layer handover procedures with one or more base stations 105 such as to support communications in highly mobile communications systems. A UE 115 may receive, from a serving base station 105, a message indicating a set of SSB resources reserved for synchronization signal transmission by the serving base station 105 and by one or more neighbor base stations 105. The set of SSB resources may include a first portion of resources associated with the serving base station 105 and one or more additional portions of resources associated with respective ones of the one or more neighbor base stations 105. The UE 115 may identify two or more symbols which are adjacent to consecutive SSB resources of the set of SSB resources. The UE 115 may exclude the two or more symbols from being used for communications between the UE 115 and the serving base station 105 based on the two or more symbols being adjacent to consecutive SSB resources. In some cases, the UE 115 may be configured to exclude the set of SSB resources or a subset of the set of SSB resources from being used for communications between the UE 115 and the serving base station 105. The UE 115 exclude the two or more symbols and/or the set or subset of SSB resources so as to mitigate interference between SSB transmissions and communications between the UE 115 and the serving base station 105. The UE 115 may communicate with the serving base station 105 on resources other than the resources being excluded. As interference to SSB transmissions during the set or subset of SSB resources may be mitigated, the UE 115 may reliably perform channel quality measurements on one or more received SSB transmissions from the serving base station 105 and/or from one or more neighboring base stations 105 to determine whether to perform a handover procedure with a neighboring base station 105.

Figure 2:
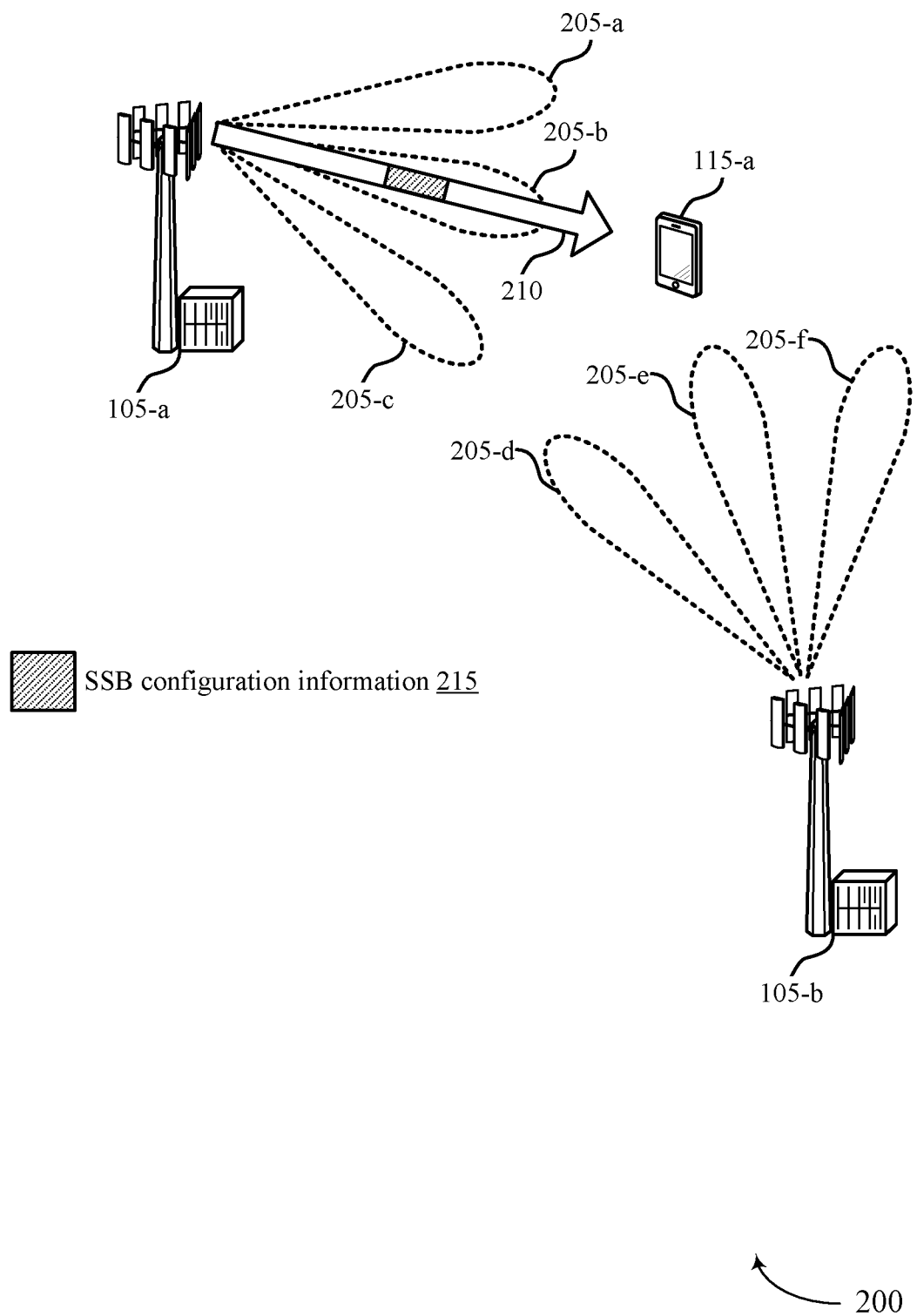
FIG. 2 illustrates an example of a wireless communications system that supports techniques for channel measurement and reporting for lower layer mobility in accordance with aspects of the present disclosure.

FIG. 2 illustrates an example of a wireless communications system 200 that supports techniques for channel measurement and reporting for lower layer mobility in accordance with aspects of the present disclosure. The wireless communications system 200 may include base stations 105-a and 105-b and UE 115-a, which may be examples of base stations 105 and a UE 115 as described with reference to FIG. 1. Base station 105-a and base station 105-b may each serve a geographic coverage area which overlap, partially overlap, or not overlap with one another. In some cases, UE 115-a may implement an SSB monitoring and measurement procedure to support lower layer mobility. Additionally or alternatively, other wireless devices, such as base station 105-a and 105-b, or some combination of these base stations 105, may implement SSB monitoring and measurement, or both for a handover procedure.

In some implementations, a UE 115 may communicate with a serving base station 105 of the UE 115 and/or communicate with one or more other base stations 105, such as neighboring base stations 105 to the UE 115. In some cases, a base station 105 as described herein may refer to a TRP, an IAB node, a cell, a wireless device, etc. For example, UE 115-a and base station 105-a may be in communications with one another, where base station 105-a may be the serving base station 105 of UE 115-a. UE 115-a may receive one or more signals from base station 105-a via communication link 210, which may be a downlink communications link. For example, base station 105-a may transmit SSB configuration information 215 to UE 115-a via communication link 210 that may allow UE 115-a to perform an SSB monitoring and measurement procedure. In some cases, the communications link may be a directional beam or may be transmitted via a directional beam, such as beam 205-b.

For example, a UE 115 may be configured to monitor for one or more downlink transmissions from a serving base station 105 of the UE 115. The UE 115 may receive an indication of a set of resources over which to monitor for the one or more downlink transmissions. For example, the UE 115 may receive an indication of a set of SSB resources (e.g., time and frequency resources), during which the serving base station 105 may transmit SSB transmissions over one or more beams 205 in a beam sweeping manner. For example, base station 105-a may transmit one or more SSB transmission in SSB resources over beams 205-a, 205-b, and 205-c. UE 115-a may monitor for the one or more SSB transmissions, and measure the power (e.g., RSRP), quality (e.g., RSRQ, SINR), etc. of one or more received SSB transmissions. In some cases, the UE 115 may be configured to refrain from transmitting or receiving transmissions (e.g., non-SSB related transmissions with a serving base station 105 or neighboring base station 105), such as data transmissions, during SSB resources associated with the serving base station 105, and during one symbol before and one symbol after each consecutive SSB resource. As the UE 115 may refrain from communications during such SSB resources, the UE 115 may reliably monitor for, receive, and measure SSB transmissions from the serving base station 105 without interference.

In some cases, UE 115-*a* may be configured to transmit a measurement report to base station 105-*a* that indicates a preferred beam 205 of UE 115-*a*. For example, the report may include each measurement of each received SSB transmission, or a number of highest measurements, where the measurements are associated with an SSB transmission and thus a beam 205. Therefore, the report may implicitly indicate a preferred beam 205. In another example, the report may explicitly indicate a beam identifier of one or more beams with the highest SSB measurements (e.g., highest quality and/or highest power measurements). Base station 105-*a* may use the information included in the SSB measurement report to determine whether to communicate with UE 115-*a* via beam 205-*a*, beam 205-*b*, or 205-*c*.

In some implementations, the UE 115 may be configured to monitor for SSB transmissions from one or more neighboring base stations 105, such as base station 105-*b*. The UE 115 may measure one or more received SSB transmissions from the neighboring base station 105 to determine whether to perform a handover procedure to the neighboring base station 105. For example, UE 115-*a* may be a highly mobile device and/or may be communicating in a highly mobile wireless communications system. As such, UE 115-*a* may benefit from an efficient handover procedure. Therefore, UE 115-*a* may be configured to perform lower layer mobility (e.g., L1/L2 mobility). An example of lower layer mobility may be a UE 115 performing a lower layer handover procedure (e.g., L1/L2 handover procedure) to a neighboring base station 105, such that the handover procedure may be performed in the physical (PHY) layer and/or the MAC layer. A lower layer handover procedure may be an efficient and dynamic method for performing handover of a UE 115 from a serving base station 105 to a neighbor base station 105.

If a UE 115 is configured to perform lower layer mobility, a UE 115 may monitor and measure SSBs from a serving base station 105 of the UE 115, or from one or more neighboring base stations 105 (e.g., base stations 105 nearby the UE 115, candidate base station 105), or both. In some cases, a UE 115 may not receive an indication of SSB resources being used by one or more of the neighboring base stations 105 for SSB transmissions and/or the UE 115 may not be configured to refrain from transmitting or receiving transmissions, such as data transmissions, during the SSB resources being used by the neighboring base stations 105. For example, UE 115-*a* may receive an indication of the SSB resources being used by serving base station 105-*b* and may be configured to refrain from performing non-SSB communications during such SSB resources. However, UE 115-*b* may not receive an indication of the SSB resources being used by neighboring base station 105-*b* and/or UE 115-*a* may not be configured to refrain from performing non-SSB communications during such SSB resources. As such, UE 115-*a* may attempt to communicate (e.g., transmit data transmissions, receive data transmissions, or both), such as with serving base station 105-*a*, during SSB resources being used by neighboring base station 105-*b*. Neighboring base station 105-*b* may transmit an SSB transmission in the same duration (e.g., symbol, slot, TTI) that UE 115-*a* may attempt to communicate with serving base station 105-*a*. Thus, the communication attempt by UE 115-*a* may interfere with the ability of UE 115-*a* to receive and measure the SSB transmission from neighboring station 105-*b* which may interfere with the ability of UE 115-*a* to perform a lower layer handover procedure with neighboring base station 105-*b*. For example, if UE 115-*a* transmits an uplink transmission in a symbol during which neighboring base station 105-*b* is transmitting an SSB transmissions, the uplink transmission may interfere with the downlink SSB transmission (e.g., self-interference), where the uplink transmission and the downlink transmission may be transmitted via the same frequency band, or via cross-interfering bands, and/or UE 115-*a* may not have the ability to transmit and receive transmissions simultaneously. As such, UE 115-*a* may be unable to reliably receive and measure the SSB transmission from neighboring base station 105-*b*. If UE 115-*a* is unable to reliably receive SSB transmissions from at least neighboring base station 105-*b*, UE 115-*a* may be unable to, or incorrectly determine whether to perform a lower layer handover procedure with at least neighboring base station 105-*b*.

To mitigate interference at a UE 115 and to improve procedures associated with lower layer mobility, such as lower layer handover procedures, a UE 115 may receive, from a serving base station 105, an indication of a set of SSB resources, where the set of resources may include SSB resources used by the serving base station 105 and SSB resources used by one or more neighboring base stations 105 of the UE 115. In some cases, the UE 115 may receive the indication from one or more non-serving base stations 105. The set of SSB resources may include the SSB resources associated with each base station 105 that is configured as a candidate handover base station 105 to the UE 115, or each base station 105 within a threshold proximity to the UE 115, or a combination thereof. For example, UE 115-*a* may receive an indication of each neighboring base station 105 that may perform lower layer mobility with UE 115, where the indication may include an identifier, such as a physical cell identifier (PCI), of each of the neighboring base stations 105 and/or the serving base station 105. The indication may also include the SSB resources associated with each base station 105 (e.g., with each PCI). In some cases, UE 115-*a* may receive the indication of the set of base stations 105 (e.g., PCIs) and the set of SSB resource associated with each base station 105 via a radio resource control (RRC) message. The base stations 105 included in the set and/or the resources included the set may be updated via an RRC message.

In some cases, the UE 115 may be configured to refrain from communicating (e.g., receiving downlink transmission, transmitting uplink transmissions) during each resource included in the set of SSB resources. Additionally or alternatively, the UE 115 may be configured to refrain from transmitting a number of time resources before (e.g., one symbol) and a number of time resources after (e.g., one symbol) each set of consecutive SSB resources in the set of SSB resources. UE 115-*a* may receive an indication to avoid communicating in such SSB resources, or may otherwise be configured to do so. For example, UE 115-*a* may receive the indication of the set of SSB resources associated with each neighboring base station 105, such as base station 105-*b*, and may identify each set of consecutive SSB resources (e.g., continuous SSB resources) within the larger set. For each set of consecutive SSB resources, UE 115-*a* may determine one resource (e.g., one symbol) before the set and one resource (e.g., one symbol) after the set of consecutive SSB resources. UE 115-*a* may refrain from communicating during each SSB resource indicated in the set, and refrain from communicating during each symbol before (e.g., immediately before, adjacent) and each symbol after (e.g., immediately before, adjacent) each set of consecutive SSB resources.

In some cases, SSBs may be layer specific. For example, some SSBs may be configured for lower layer measurement (e.g., L1 measurement) and some may be configured for higher layer measurement. For example, a base station 105 may be configured for lower layer mobility, but one or more SSB resources associated with the base station 105 may not be configured for lower layer measurement by a UE 115. In some cases, such SSB resources may be excluded from the set even if the base station 105 is a candidate neighboring base station 105 such that one or more other SSB resources (e.g., lower layer configured SSB resources) of the base station 105 are included in the set. As such, the UE 115 may communicate during such SSB resources (e.g., higher layer SSB resources) excluded from the set. In some cases, the SSB resources that are not configured for lower layer measurement may be included in the set, such that the UE 115 may be configured to refrain from communicating during such SSB resources, even though the SSB resource may not be configured for lower layer measurement.

In some implementations, the UE 115 may receive an indication (e.g., an additional indication) of a subset of the set of SSB resources. The indication of the set of SSB resources and the indication of the subset of SSB resources may be included in the same message, or different messages. In some cases, the UE 115 may explicitly or implicitly determine the SSB resources included in the subset based on group information (e.g., a group identifier identifying a group of base stations 105 included in the subset) or based on a PCI of each base station 105 included in the subset. For example, the indication of the subset of SSB resources may include an explicit indication of each PCI and/or each SSB resource included in the subset. If the indication includes the PCI of each base station 105 included in the group, the UE 115 may determine, from the indication of the set, the SSB resources associated with each PCI indicated in the subset. Base stations 105, and the SSB resources associated with each base station 105 included in the subset may be based on the mobility or a mobility pattern of the UE 115, based on proximity of the base station 105 to the UE 115, etc. The UE 115 may receive an indication or otherwise be configured to refrain from communicating during each resource included in the subset. For example, receiving the indication of the subset may be an implicit indication for the UE 115 to refrain from communicating during each SSB resource in the subset, rather than the set.

As described herein, the UE 115 may refrain from transmitting a number of time resources before (e.g., one symbol) and a number of time resources after (e.g., one symbol) each set of consecutive SSB resources in the subset of SSB resources. UE 115-*a* may receive an indication to avoid communicating in such SSB resources, or may otherwise be configured to do so. For example, UE 115-*a* may receive the indication of the subset of SSB resources, and may identify each set of consecutive SSB resources (e.g., continuous SSB resources) within the larger subset. For each set of consecutive SSB resources, UE 115-*a* may determine one resource (e.g., one symbol) before the set and one resource (e.g., one symbol) after the set of consecutive SSB resources. UE 115-*a* may refrain from communicating during each SSB resource indicated in the subset, and refrain from communicating during each symbol before (e.g., immediately before, adjacent) and each symbol after (e.g., immediately before, adjacent) each set of consecutive SSB resources.

In some implementations, the UE 115 may monitor for SSB transmissions during the set of SSB resources and/or the subset of SSB resources. The UE may measure one or more parameters (e.g., RSRP, RSRQ, SINR) of the one or more received SSB transmissions, where the SSB transmissions may be transmitted by a serving base station 105 or neighboring base station 105. The UE 115 may measure the one or more received SSB transmissions to determine the beam (e.g., a preferred beam) over which the UE 115 receives a highest (or high) power and/or quality signal. In some cases, the UE 115 may transmit a measurement report for one or more of the received SSB transmissions, such as one or more SSB transmissions with the highest measurements (e.g., highest quality, highest power), and/or the UE 115 may transmit a measurement report for each of the received SSB transmissions. The UE 115 may be configured to measure and transmit a measurement report for SSB transmissions in SSB resources that are configured for lower layer (e.g., L1) reporting, and SSB transmissions in SSB resources that are not configured for lower layer (e.g., L1) reporting. For example, if the SSB resource is included in the set or subset, even if the UE 115 has not received an indication that a certain SSB resource or SSB transmission is configured for L1 reporting, the UE 115 may perform L1-based measurements and report the L1-based measurements (e.g., autonomously).

In some implementations, the UE 115 may be configured to report SSB measurements based on an event (e.g., an A1, A2, A3 trigger), rather than the SSB being configured for lower layer-based measurement and reporting. For example, a trigger may include the UE 115 measuring an SSB transmission with a higher signal strength or quality than any SSB transmission from the serving base station 105 of the UE 115. In some cases, a trigger may include an SSB measurement above a threshold. Upon such determination, the UE 115 may be triggered to transmit a report associated with the SSB transmission from the neighboring base station 105 or serving base station 105. As such, the UE 115 may (autonomously) measure and report on SSB transmissions of a high quality or signal strength via an event-triggered report when any SSB transmission has a measurement above a threshold or that which is higher than the SSB measurements of the serving base station 105, even if the SSB transmissions were not configured for L1 reporting for the UE 115. The UE 115 may transmit a separate report for each SSB transmission the UE 115 determines to report on, or the UE 115 may transmit one report including one or more SSB measurements. The UE may transmit the report to the serving base station 105 of the UE 115.

For example, base station 105-*a* may be configured to transmit SSB transmissions over beams 205-*a*, 205-*b*, and 205-*c*, in a first set of SSB resources and base station 105-*b* may be configured to transmit SSB transmissions over beams 205-*d*, 205-*e*, and 205-*f*, in a second set of SSB resources. The first set of SSB resources and the second set of SSB resources may overlap, or partially overlap. Base station 105-*a* may receive an indication or otherwise identify that base station 105-*b* is a neighboring base station 105-*b* to UE 115-*b* and include the second set of SSB resources in a set of SSB resources, along with first set of SSB resources. Base station 105-*a* may transmit SSB configuration information 215 to UE 115-*a* that may indicate base station 105-*a* and base station 105-*b*, such as by the corresponding PCIs of the two base stations 105, and may indicate the set of SSB resources (e.g., the set of SSB resources including the first set and the second set of SSB resources). The indication may include an association of the first set of SSB resources with base station 105-*a* and the second set of resources with base station 105-*b*. Additionally or alternatively, UE 115-*a* may receive an indication of a subset of the set of SSB resources. UE 115-*a* may be configured to refrain from communicating during the SSB resources in the set, and/or the subset. For example, if UE 115-*a* receives an indication of the subset, UE 115-*a* may refrain from communicating in just the subset of SSB resources. In another example, if UE 115-*a* does not receive the indication of the subset, UE 115-*a* may refrain from communicating during the full set of SSB resources. In some cases, UE 115-*a* may monitor for and measure any SSB transmission received in the set of SSB resources or the subset of SSB resources, based on the indications received by UE 115-*a*. UE 115-*a* may transmit one or more measurement reports to base station 105-*a* that indicate one or more SSB measurements, one or more SSB transmissions, and/or one or more beams 205 (e.g., preferred beams 205).

In some cases, the SSB measurements included in the one or more reports may be based on a trigger. For example, UE 115-*a* may include SSB measurements in the one or more reports based on the SSB measurements being above a threshold, or based on the SSB measurements, such as SSB measurements associated with neighboring base station 105-*b*, being higher than the SSB measurements from serving base station 105-*a*. In some cases, UE 115-*a* may request a handover procedure based on the SSB measurements, such as if UE 115-*a* receives a higher measured SSB from neighboring base station 105-*b* than from serving base station 105-*a*. Base station 105-*a* may receive the one or more reports, and determine a beam 205 to communicate with UE 115-*a* based on the one or more reports. In some cases, base station 105-*a* may initiate a handover procedure of UE 115-*a* from serving base station 105-*a* to neighboring base station 105-*b* based on the one or more reports and/or based on a request from UE 115-*a*. Although described with reference to lower layer mobility, the techniques described herein may be used in any mobility scenario such as in higher layer mobility.

Figure 3:
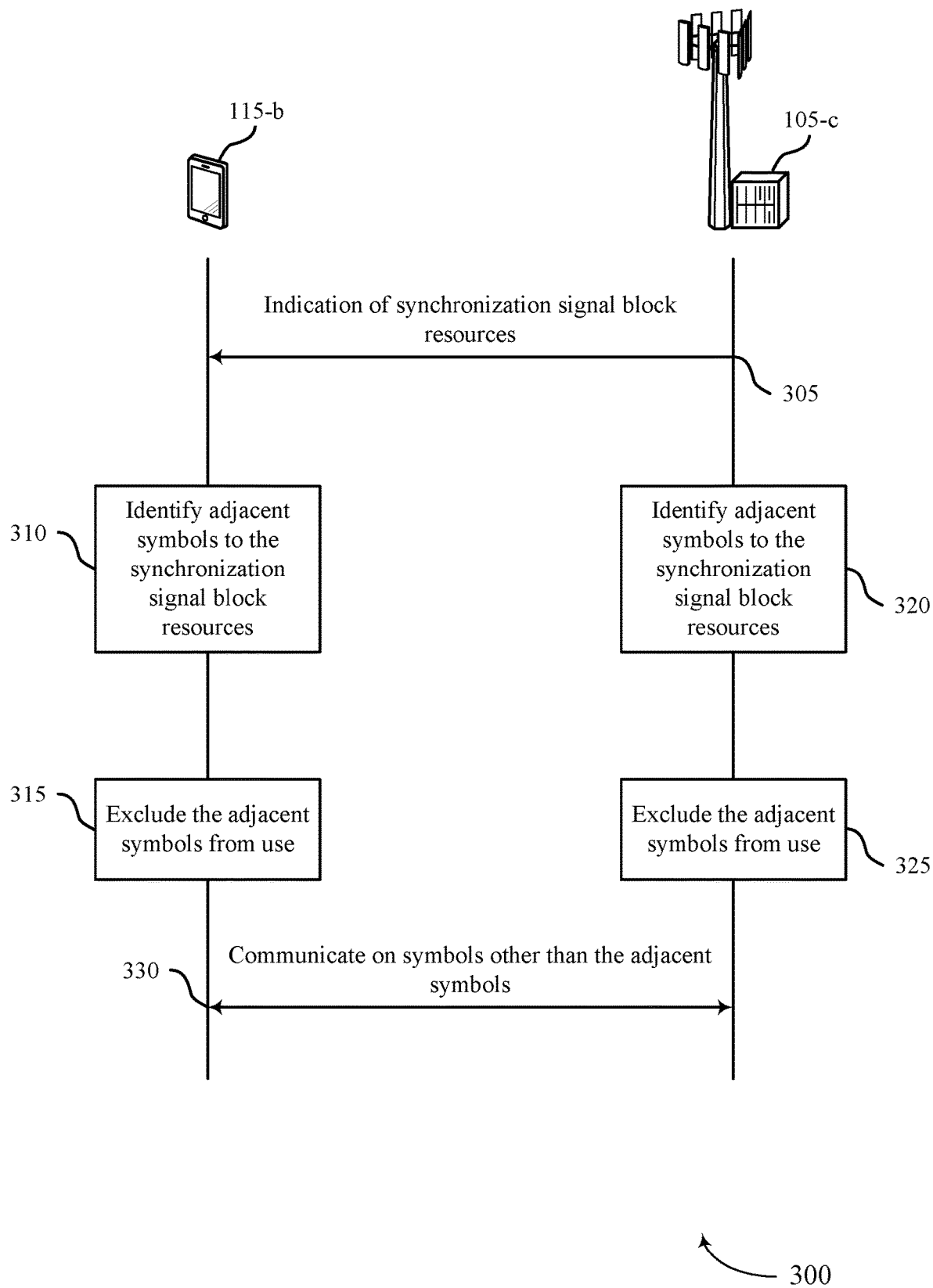
FIG. 3 illustrates an example of a process flow that supports techniques for channel measurement and reporting for lower layer mobility in accordance with aspects of the present disclosure.

FIG. 3 illustrates an example of a process flow 300 that supports techniques for channel measurement and reporting for lower layer mobility in accordance with aspects of the present disclosure. The process flow 300 may illustrate an example SSB monitoring and measurement scheme. For example, UE 115-*b* may monitor for SSB transmissions from at least base station 105-*c* for beam selection or handover. Base station 105-*c* and UE 115-*b* may be examples of the corresponding wireless devices described with reference to FIGS. 1 and 2. In some cases, instead of UE 115-*b* implementing the SSB monitoring and measurement procedure, a different type of wireless device (e.g., a base station 105) may perform the procedure. Alternative examples of the following may be implemented, where some steps are performed in a different order than described or are not performed at all. In some cases, steps may include additional features not mentioned below, or further steps may be added.

At 305, UE 115-*b* may receive, from serving base station 105-*c*, a message indicating a set of SSB resources reserved for synchronization signal transmission by serving base station 105-*c* and by one or more neighbor base stations 105. The set of SSB resources may include a first portion of resources associated with serving base station 105-*c* and one or more additional portions of resources associated with respective ones of the one or more neighbor base stations 105. The first portion of resources associated with serving base station 105-*c* and the one or more additional portions of resources with respective ones of the one or more neighbor base stations 105 partially overlap in a time-domain. In some cases, receiving the message indicating the set of SSB resources, includes UE 115-*b* receiving an RRC signal including the message indicating the set of SSB resources.

At 310, UE 115-*b* may identify two or more symbols which are adjacent consecutive SSB resources of the set of SSB resources.

At 315, UE 115-*b* may exclude the two or more symbols from being used for communications between UE 115-*b* and serving base station 105-*c* based on the two or more symbols being adjacent to consecutive SSB resources. For example, UE 115-*b* may not transmit or receive messages from base station 105-*c* during the excluded symbols. In some cases, UE 115-*b* may exclude the set of SSB resources from being used for communications between the UE and the serving base station. UE 115-*b* may exclude an adjacent symbol prior to each SSB resource of the set of SSB resources and an adjacent symbol after each SSB resource of the set of SSB resources from being used for communications between UE 115-*b* and serving base station 105-*c*.

In some cases, UE 115-*b* may receive a second message indicating a subset of SSB resources of the set of SSB resources to be excluded from being used for communications between UE 115-*b* and serving base station 105-*c*. UE 115-*b* may exclude the subset of SSB resources from being used for communications between UE 115-*b* and serving base station 105-*c* based on the second message. UE 115-*b* may exclude an adjacent symbol prior to each SSB resource of the subset of SSB resources and an adjacent symbol after each SSB resource of the subset of SSB resources from being used for communications between UE 115-*b* and serving base station 105-*c*.

In some implementations, UE 115-*b* may receive an indication of a set of PCIs, the indication may include an association between each SSB resource of the set of SSB resources and a PCI of the set of PCIs. In some cases, UE 115-*b* may receive the second message, the second message including a subset of PCIs of the set of PCIs. The subset of PCIs may implicitly indicate the subset of SSB resources based on the association. Serving base station 105-*c* may be associated with a first PCI of the set of PCIs, and each neighbor base station 105 of the one or more neighbor base stations 105 may be associated with a different PCI of the set of PCIs.

In some cases, UE 115-*b* may receive a second message indicating a subset of SSB resources of the set of SSB resources that are configured for UE 115-*b* to measure and report on. UE 115-*b* may monitor for SSB transmissions in the subset of SSB resources based on the second message, measure a quality of a set of SSB transmissions received by UE 115-*b* during the subset of SSB resources, and transmit, to serving base station 105-*c*, a report indicating the SSB with a highest measured quality (or power). UE 115-*b* may initiate a handover procedure with serving base station 105-*c* and a neighbor base station 105 of the one or more neighbor base stations 105 based on the neighbor base station 105 being associated with the SSB with the highest measured quality. In some cases, serving base station 105-*c* may initiate the handover procedure based on the report from UE 115-*c*. The handover procedure may be a lower layer handover procedure. The lower layer handover procedure may include physical layer signaling, or MAC signaling, or both.

In some cases, UE 115-*b* may monitor for SSB transmissions in the set of SSB resources based on the message, and measure a quality of a set of SSB transmissions received by UE 115-*b* during the set of SSB resources. UE 115-*b* may determine an SSB transmission of the set of SSB transmissions with a highest measured quality, where the SSB transmission with the highest measured quality may not have been received in the subset of SSB resources. UE 115-*b* may transmit, to serving base station 105-*c*, a report indicating the SSB with the highest measured quality. UE 115-*b* may initiate a handover procedure with serving base station 105-*c* and a neighbor base station 105 of the one or more neighbor base stations 105 based on the neighbor base station 105 being associated with the SSB with the highest measured quality. The handover procedure may be a lower layer handover procedure. The lower layer handover procedure may include physical layer signaling, or MAC signaling, or both.

At 320, base station 105-c may identify two or more symbols which are adjacent consecutive SSB resources of the set of SSB resources.

At 325, base station 105-c may exclude the two or more symbols from being used for communications between UE 115-b and base station 105-c based on the two or more symbols being adjacent to consecutive SSB resources. For example, base station 105-c may not transmit or receive messages from UE 115-b during the excluded symbols.

At 330, UE 115-b may communicate with serving base station 105-c on symbols other than the two or more symbols.

Figure 4:
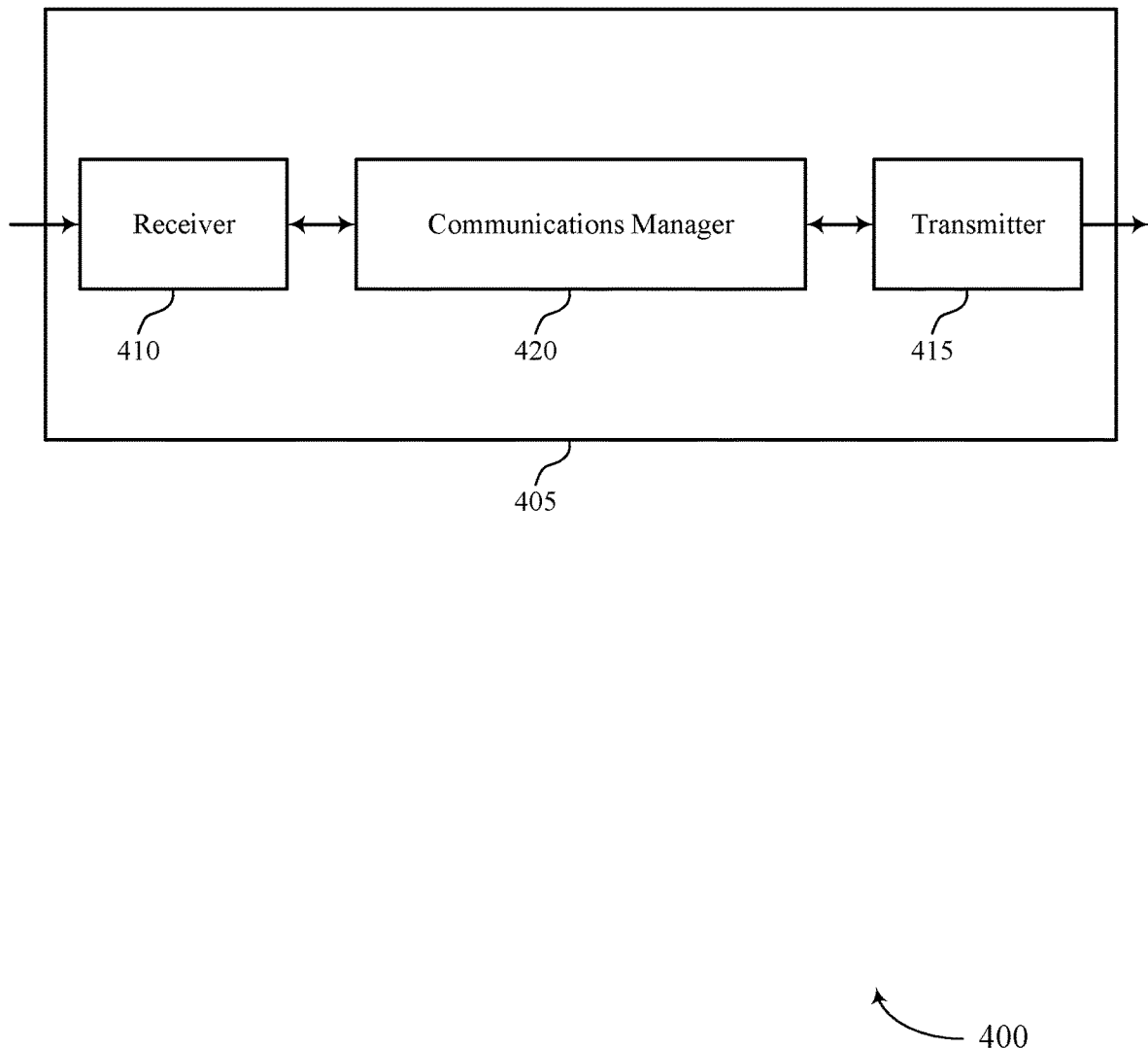
FIGS. 4 and 5 show block diagrams of devices that support techniques for channel measurement and reporting for lower layer mobility in accordance with aspects of the present disclosure.

FIG. 4 shows a block diagram 400 of a device 405 that supports techniques for channel measurement and reporting for lower layer mobility in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for channel measurement and reporting for lower layer mobility). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for channel measurement and reporting for lower layer mobility). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for channel measurement and reporting for lower layer mobility as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The communications manager 420 may be configured as or otherwise support a means for identifying two or more symbols which are adjacent to consecutive SSB resources of the set of multiple SSB resources. The communications manager 420 may be configured as or otherwise support a means for excluding the two or more symbols from being used for communications between the UE and the serving base station based on the two or more symbols being adjacent to the consecutive SSB resources. The communications manager 420 may be configured as or otherwise support a means for communicating with the serving base station on symbols other than the two or more symbols.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources and increased reliability.

Figure 5:
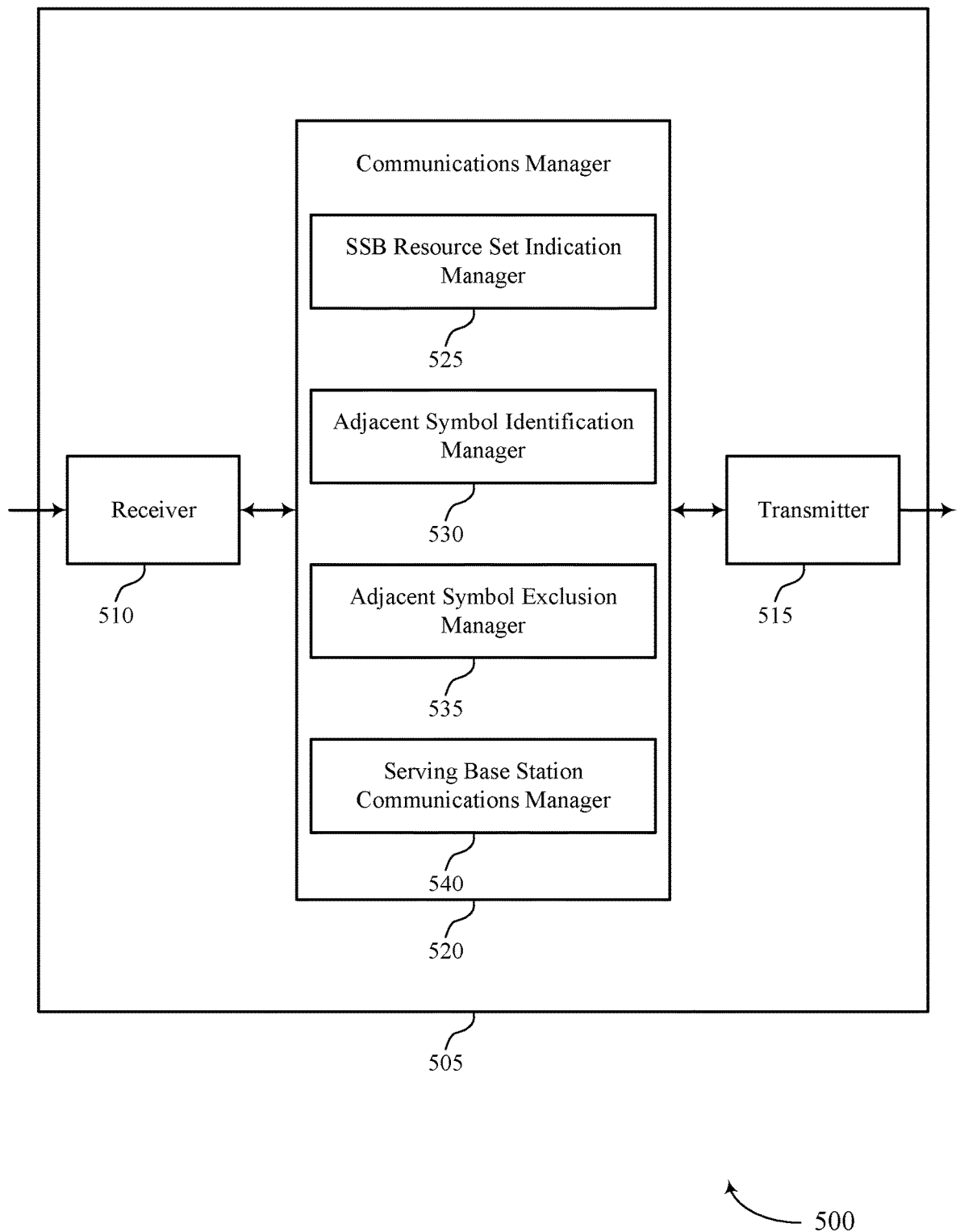

FIG. 5 shows a block diagram 500 of a device 505 that supports techniques for channel measurement and reporting for lower layer mobility in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for channel measurement and reporting for lower layer mobility). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for channel measurement and reporting for lower layer mobility). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for channel measurement and reporting for lower layer mobility as described herein. For example, the communications manager 520 may include an SSB resource set indication manager 525, an adjacent symbol identification manager 530, an adjacent symbol exclusion manager 535, a serving base station communications manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The SSB resource set indication manager 525 may be configured as or otherwise support a means for receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The adjacent symbol identification manager 530 may be configured as or otherwise support a means for identifying two or more symbols which are adjacent to consecutive SSB resources of the set of multiple SSB resources. The adjacent symbol exclusion manager 535 may be configured as or otherwise support a means for excluding the two or more symbols from being used for communications between the UE and the serving base station based on the two or more symbols being adjacent to the consecutive SSB resources. The serving base station communications manager 540 may be configured as or otherwise support a means for communicating with the serving base station on symbols other than the two or more symbols.

Figure 6:
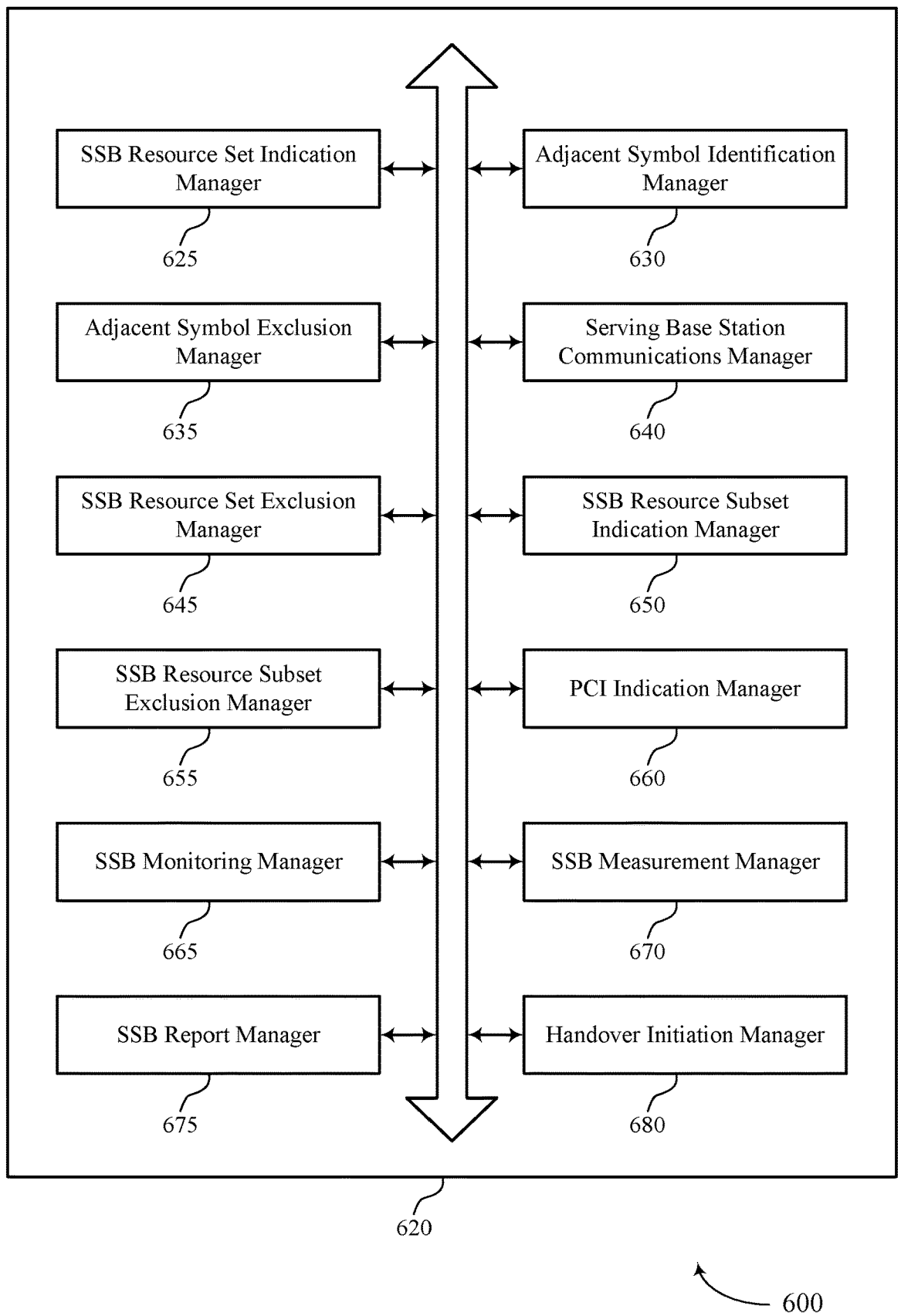
FIG. 6 shows a block diagram of a communications manager that supports techniques for channel measurement and reporting for lower layer mobility in accordance with aspects of the present disclosure.

FIG. 6 shows a block diagram 600 of a communications manager 620 that supports techniques for channel measurement and reporting for lower layer mobility in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for channel measurement and reporting for lower layer mobility as described herein. For example, the communications manager 620 may include an SSB resource set indication manager 625, an adjacent symbol identification manager 630, an adjacent symbol exclusion manager 635, a serving base station communications manager 640, an SSB resource set exclusion manager 645, an SSB resource subset indication manager 650, an SSB resource subset exclusion manager 655, a PCI indication manager 660, an SSB monitoring manager 665, an SSB measurement manager 670, an SSB report manager 675, a handover initiation manager 680, or any combination thereof. Each of these components may communicate, directly or indirectly, with one another (e.g., via one or more buses).

The communications manager 620 may support wireless communications at a UE in accordance with examples as disclosed herein. The SSB resource set indication manager 625 may be configured as or otherwise support a means for receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The adjacent symbol identification manager 630 may be configured as or otherwise support a means for identifying two or more symbols which are adjacent to consecutive SSB resources of the set of multiple SSB resources. The adjacent symbol exclusion manager 635 may be configured as or otherwise support a means for excluding the two or more symbols from being used for communications between the UE and the serving base station based on the two or more symbols being adjacent to the consecutive SSB resources. The serving base station communications manager 640 may be configured as or otherwise support a means for communicating with the serving base station on symbols other than the two or more symbols.

In some examples, the SSB resource set exclusion manager 645 may be configured as or otherwise support a means for excluding the set of multiple SSB resources from being used for communications between the UE and the serving base station.

In some examples, to support excluding the two or more symbols, the adjacent symbol identification manager 630 may be configured as or otherwise support a means for excluding an adjacent symbol prior to each SSB resource of the set of multiple SSB resources and an adjacent symbol after each SSB resource of the set of multiple SSB resources from being used for communications between the UE and the serving base station.

In some examples, the message is a first message, and the SSB resource subset indication manager 650 may be configured as or otherwise support a means for receiving a second message indicating a subset of SSB resources of the set of multiple SSB resources to be excluded from being used for communications between the UE and the serving base station.

In some examples, the SSB resource subset exclusion manager 655 may be configured as or otherwise support a means for excluding the subset of SSB resources from being used for communications between the UE and the serving base station based on the second message.

In some examples, to support excluding the two or more symbols, the adjacent symbol exclusion manager 635 may be configured as or otherwise support a means for excluding an adjacent symbol prior to each SSB resource of the subset of SSB resources and an adjacent symbol after each SSB resource of the subset of SSB resources from being used for communications between the UE and the serving base station.

In some examples, to support receiving the first message indicating the set of multiple SSB resources, the PCI indication manager 660 may be configured as or otherwise support a means for receiving an indication of a set of multiple PCIs, the indication including an association between each SSB resource of the set of multiple SSB resources and a PCI of the set of multiple PCIs.

In some examples, to support receiving the second message indicating the subset of SSB resources, the PCI indication manager 660 may be configured as or otherwise support a means for receiving the second message, the second message including a subset of PCIs of the set of multiple PCIs, the subset of PCIs implicitly indicating the subset of SSB resources based on the association.

In some examples, the serving base station is associated with a first PCI of the set of multiple PCIs, and each neighbor base station of the one or more neighbor base stations is associated with a different PCI of the set of multiple PCIs.

In some examples, the message is a first message, and the SSB resource subset indication manager 650 may be configured as or otherwise support a means for receiving a second message indicating a subset of SSB resources of the set of multiple SSB resources that are configured for the UE to measure and report on.

In some examples, the SSB monitoring manager 665 may be configured as or otherwise support a means for monitoring for SSB transmissions in the subset of SSB resources based on the second message. In some examples, the SSB measurement manager 670 may be configured as or otherwise support a means for measuring a quality of a set of multiple SSB transmissions received by the UE during the subset of SSB resources. In some examples, the SSB report manager 675 may be configured as or otherwise support a means for transmitting, to the serving base station, a report indicating the SSB with a highest measured quality.

In some examples, the handover initiation manager 680 may be configured as or otherwise support a means for initiating a handover procedure with the serving base station and a neighbor base station of the one or more neighbor base stations based on the neighbor base station being associated with the SSB with the highest measured quality, the handover procedure a lower layer handover procedure.

In some examples, the lower layer handover procedure includes physical layer signaling, or MAC signaling, or both.

In some examples, the SSB monitoring manager 665 may be configured as or otherwise support a means for monitoring for SSB transmissions in the set of multiple SSB resources based on the first message. In some examples, the SSB measurement manager 670 may be configured as or otherwise support a means for measuring a quality of a set of multiple SSB transmissions received by the UE during the set of multiple SSB resources. In some examples, the SSB measurement manager 670 may be configured as or otherwise support a means for determining a SSB transmission of the set of multiple SSB transmissions with a highest measured quality, the SSB transmission with the highest measured quality not received in the subset of SSB resources. In some examples, the SSB report manager 675 may be configured as or otherwise support a means for transmitting, to the serving base station, a report indicating the SSB with the highest measured quality.

In some examples, the handover initiation manager 680 may be configured as or otherwise support a means for initiating a handover procedure with the serving base station and a neighbor base station of the one or more neighbor base stations based on the neighbor base station being associated with the SSB with the highest measured quality, the handover procedure a lower layer handover procedure.

In some examples, the lower layer handover procedure includes physical layer signaling, or MAC signaling, or both.

In some examples, the first portion of resources associated with the serving base station and the one or more additional portions of resources with respective ones of the one or more neighbor base stations partially overlap in a time-domain.

In some examples, to support receiving the message indicating the set of multiple SSB resources, the SSB resource set indication manager 625 may be configured as or otherwise support a means for receiving an RRC signal including the message indicating the set of multiple SSB resources.

Figure 7:
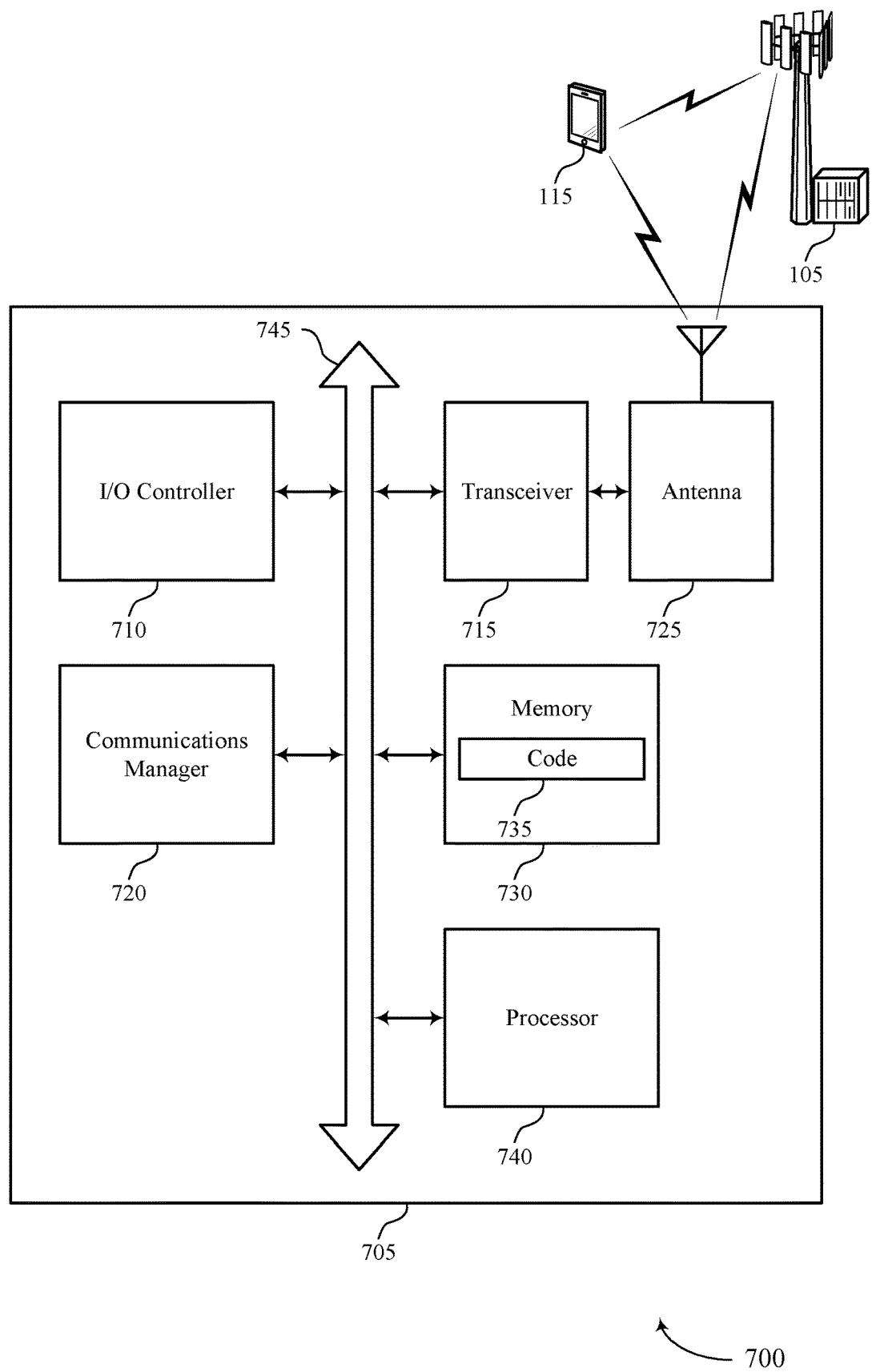
FIG. 7 shows a diagram of a system including a device that supports techniques for channel measurement and reporting for lower layer mobility in accordance with aspects of the present disclosure.

FIG. 7 shows a diagram of a system 700 including a device 705 that supports techniques for channel measurement and reporting for lower layer mobility in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for channel measurement and reporting for lower layer mobility). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The communications manager 720 may be configured as or otherwise support a means for identifying two or more symbols which are adjacent to consecutive SSB resources of the set of multiple SSB resources. The communications manager 720 may be configured as or otherwise support a means for excluding the two or more symbols from being used for communications between the UE and the serving base station based on the two or more symbols being adjacent to the consecutive SSB resources. The communications manager 720 may be configured as or otherwise support a means for communicating with the serving base station on symbols other than the two or more symbols.

By including or configuring the communications manager 720 in accordance with examples as described herein, the device 705 may support techniques for improved communication reliability, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for channel measurement and reporting for lower layer mobility as described herein, or the processor 740 and the memory 730 may be otherwise configured to perform or support such operations.

Figure 8:
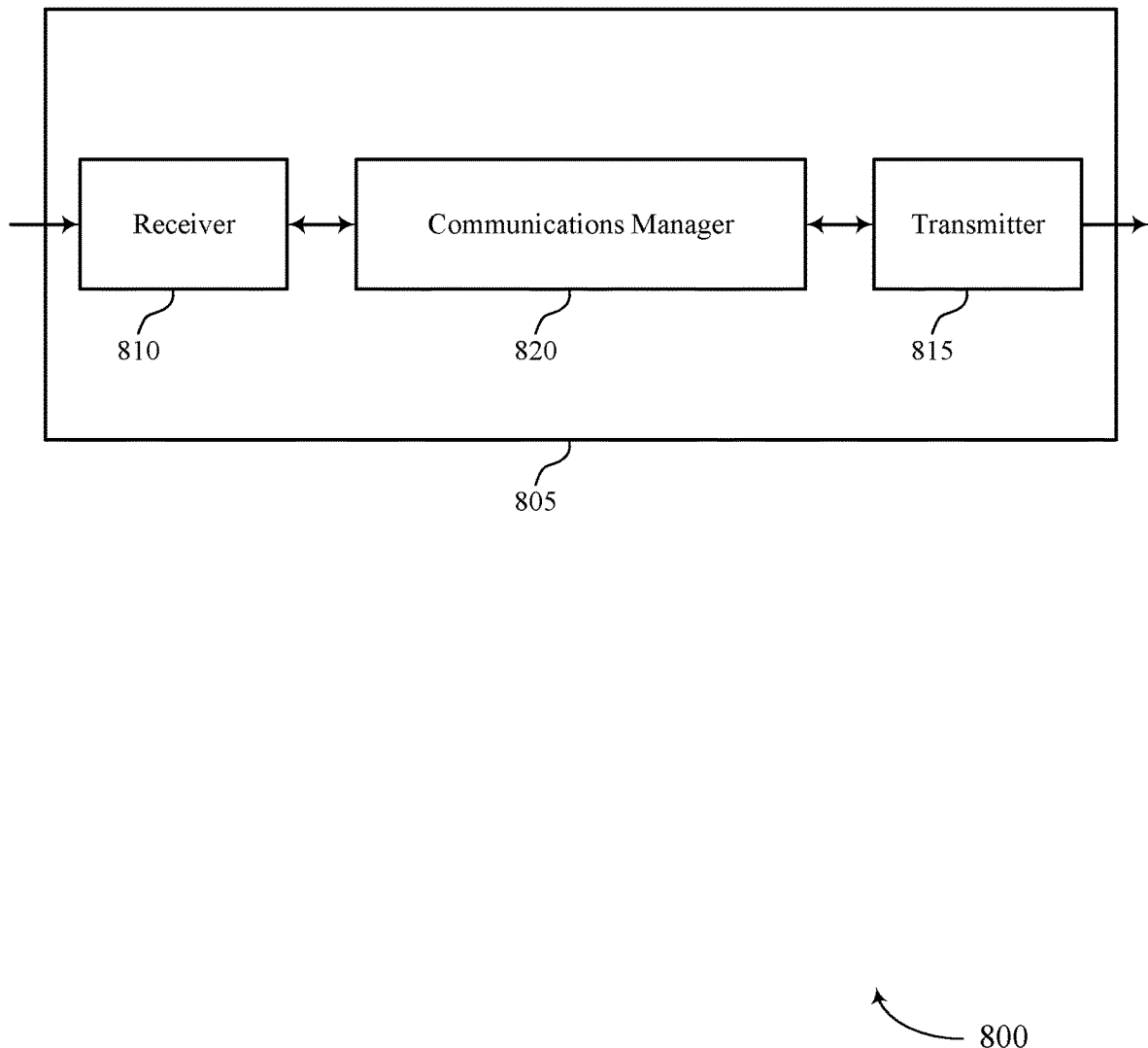
FIGS. 8 and 9 show block diagrams of devices that support techniques for channel measurement and reporting for lower layer mobility in accordance with aspects of the present disclosure.

FIG. 8 shows a block diagram 800 of a device 805 that supports techniques for channel measurement and reporting for lower layer mobility in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for channel measurement and reporting for lower layer mobility). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for channel measurement and reporting for lower layer mobility). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for channel measurement and reporting for lower layer mobility as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, a message indicating a set of multiple SSB resources reserved for synchronization signal transmission by the base station and by one or more neighbor base stations to the UE, the set of multiple SSB resources including a first portion of resources associated with the base station and one or more additional portions of resources associated with respective ones of the one or more neighbor base stations. The communications manager 820 may be configured as or otherwise support a means for identifying two or more symbols which are adjacent to consecutive SSB resources of the set of multiple SSB resources. The communications manager 820 may be configured as or otherwise support a means for excluding the two or more symbols from being used for communications between the UE and the base station based on the two or more symbols being adjacent to the consecutive SSB resources. The communications manager 820 may be configured as or otherwise support a means for communicating with the UE on symbols other than the two or more symbols.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, and improved reliability.

Figure 9:
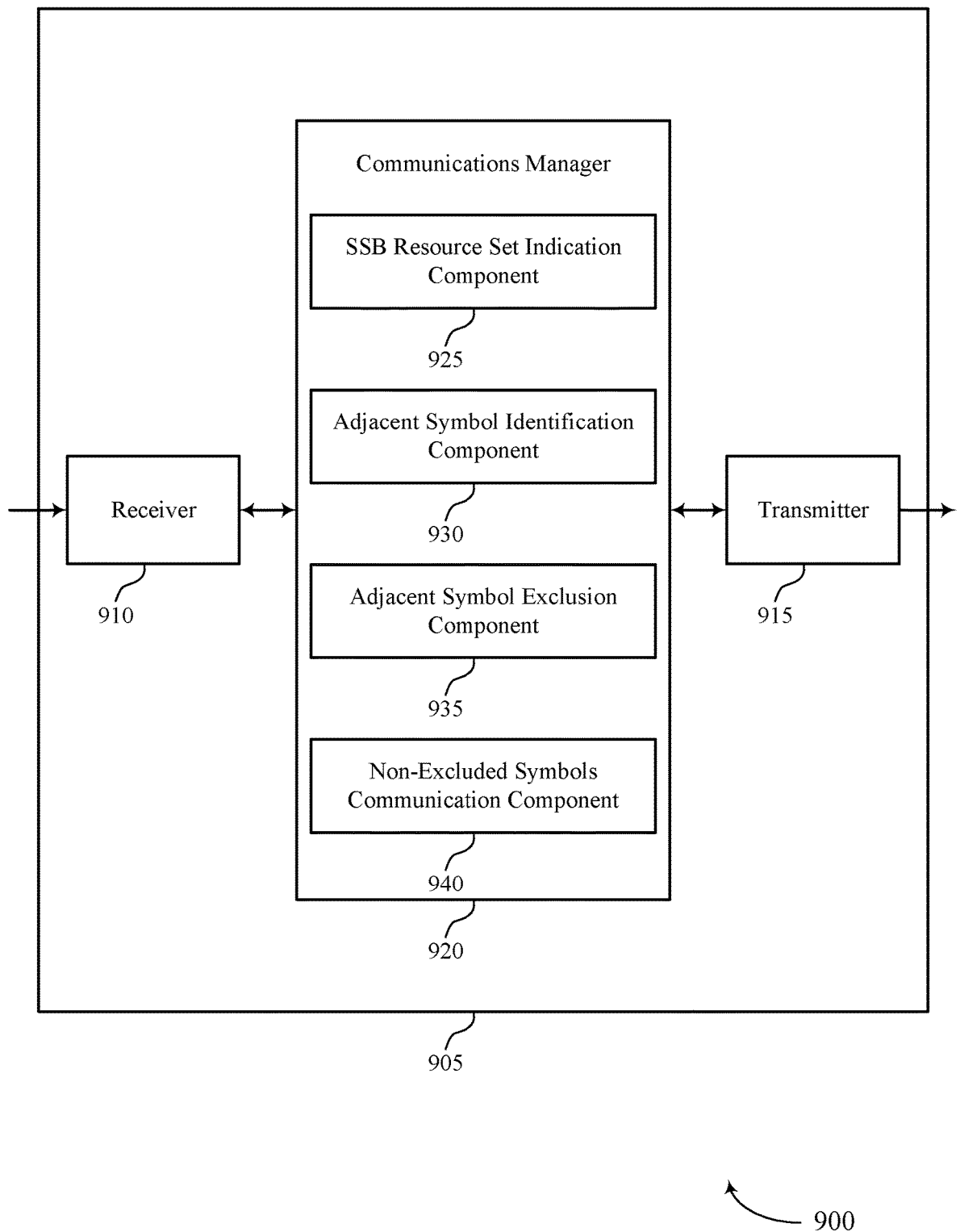

FIG. 9 shows a block diagram 900 of a device 905 that supports techniques for channel measurement and reporting for lower layer mobility in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for channel measurement and reporting for lower layer mobility). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for channel measurement and reporting for lower layer mobility). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for channel measurement and reporting for lower layer mobility as described herein. For example, the communications manager 920 may include an SSB resource set indication component 925, an adjacent symbol identification component 930, an adjacent symbol exclusion component 935, a non-excluded symbols communication component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The SSB resource set indication component 925 may be configured as or otherwise support a means for transmitting, to a UE, a message indicating a set of multiple SSB resources reserved for synchronization signal transmission by the base station and by one or more neighbor base stations to the UE, the set of multiple SSB resources including a first portion of resources associated with the base station and one or more additional portions of resources associated with respective ones of the one or more neighbor base stations. The adjacent symbol identification component 930 may be configured as or otherwise support a means for identifying two or more symbols which are adjacent to consecutive SSB resources of the set of multiple SSB resources. The adjacent symbol exclusion component 935 may be configured as or otherwise support a means for excluding the two or more symbols from being used for communications between the UE and the base station based on the two or more symbols being adjacent to the consecutive SSB resources. The non-excluded symbols communication component 940 may be configured as or otherwise support a means for communicating with the UE on symbols other than the two or more symbols.

Figure 10:
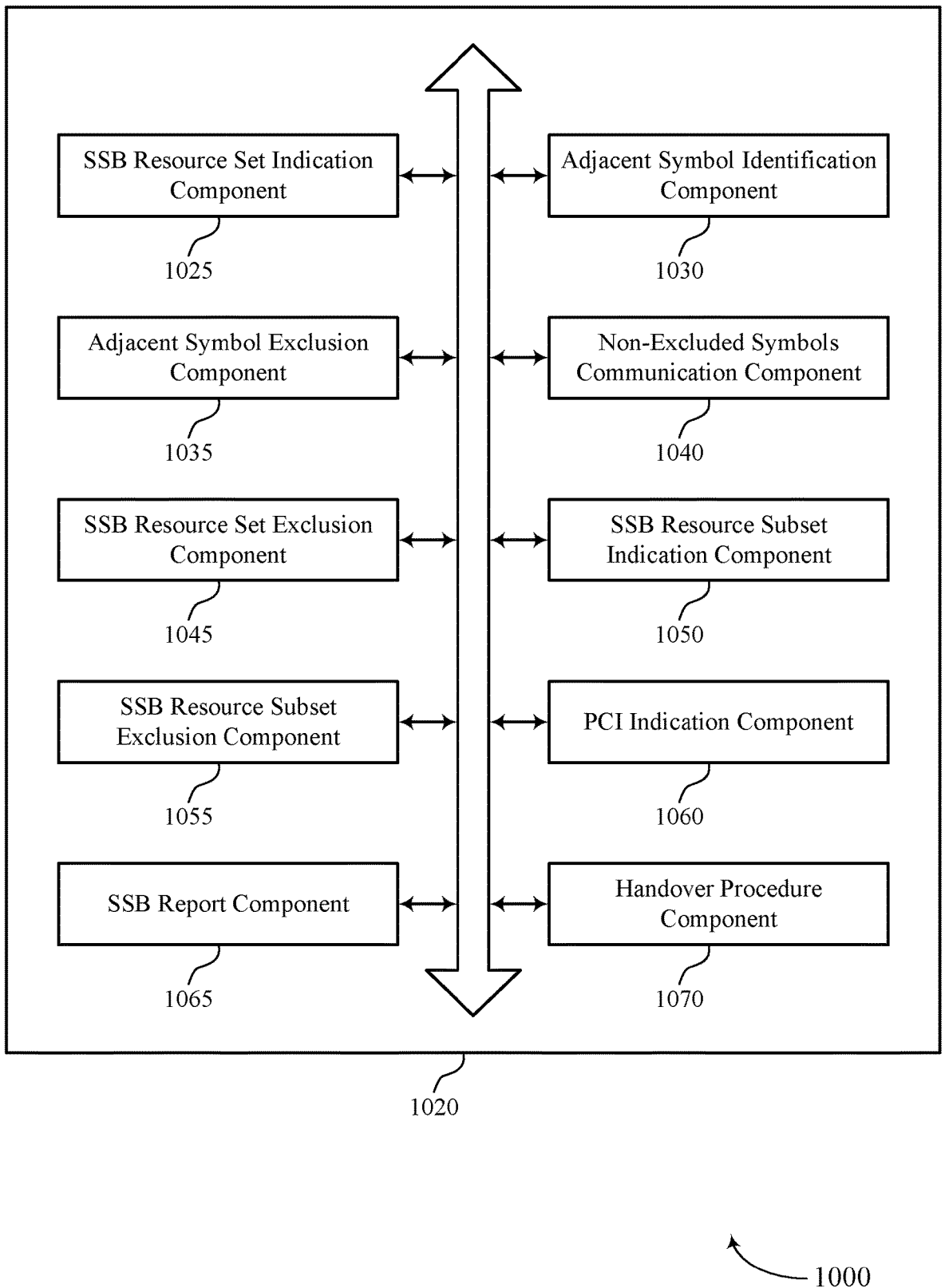
FIG. 10 shows a block diagram of a communications manager that supports techniques for channel measurement and reporting for lower layer mobility in accordance with aspects of the present disclosure.

FIG. 10 shows a block diagram 1000 of a communications manager 1020 that supports techniques for channel measurement and reporting for lower layer mobility in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for channel measurement and reporting for lower layer mobility as described herein. For example, the communications manager 1020 may include an SSB resource set indication component 1025, an adjacent symbol identification component 1030, an adjacent symbol exclusion component 1035, a non-excluded symbols communication component 1040, an SSB resource set exclusion component 1045, an SSB resource subset indication component 1050, an SSB resource subset exclusion component 1055, a PCI indication component 1060, an SSB report component 1065, a handover procedure component 1070, or any combination thereof. Each of these components may communicate, directly or indirectly, with one another (e.g., via one or more buses).

The communications manager 1020 may support wireless communications at a base station in accordance with examples as disclosed herein. The SSB resource set indication component 1025 may be configured as or otherwise support a means for transmitting, to a UE, a message indicating a set of multiple SSB resources reserved for synchronization signal transmission by the base station and by one or more neighbor base stations to the UE, the set of multiple SSB resources including a first portion of resources associated with the base station and one or more additional portions of resources associated with respective ones of the one or more neighbor base stations. The adjacent symbol identification component 1030 may be configured as or otherwise support a means for identifying two or more symbols which are adjacent to consecutive SSB resources of the set of multiple SSB resources. The adjacent symbol exclusion component 1035 may be configured as or otherwise support a means for excluding the two or more symbols from being used for communications between the UE and the base station based on the two or more symbols being adjacent to the consecutive SSB resources. The non-excluded symbols communication component 1040 may be configured as or otherwise support a means for communicating with the UE on symbols other than the two or more symbols.

In some examples, the SSB resource set exclusion component 1045 may be configured as or otherwise support a means for excluding the set of multiple SSB resources from being used for communications between the UE and the base station.

In some examples, to support excluding the two or more symbols, the adjacent symbol exclusion component 1035 may be configured as or otherwise support a means for excluding an adjacent symbol prior to each SSB resource of the set of multiple SSB resources and an adjacent symbol after each SSB resource of the set of multiple SSB resources from being used for communications between the UE and serving base station.

In some examples, the message is a first message, and the SSB resource subset indication component 1050 may be configured as or otherwise support a means for transmitting a second message indicating a subset of SSB resources of the set of multiple SSB resources to be excluded from being used for communications between the UE and the base station.

In some examples, the SSB resource subset exclusion component 1055 may be configured as or otherwise support a means for excluding the subset of SSB resources from being used for communications between the UE and the base station based on the second message.

In some examples, to support excluding the two or more symbols, the adjacent symbol exclusion component 1035 may be configured as or otherwise support a means for excluding an adjacent symbol prior to each SSB resource of the subset of SSB resources and an adjacent symbol after each SSB resource of the subset of SSB resources from being used for communications between the UE and the base station.

In some examples, to support transmitting the first message indicating the set of multiple SSB resources, the PCI indication component 1060 may be configured as or otherwise support a means for transmitting an indication of a set of multiple PCIs, the indication including an association between each SSB resource of the set of multiple SSB resources and a PCI of the set of multiple PCIs.

In some examples, to support receiving the second message indicating the subset of SSB resources, the PCI indication component 1060 may be configured as or otherwise support a means for receiving the second message, the second message including a subset of PCIs of the set of multiple PCIs, the subset of PCIs implicitly indicating the subset of SSB resources based on the association.

In some examples, the base station is associated with a first PCI of the set of multiple PCIs, and each neighbor base station of the one or more neighbor base stations is associated with a different PCI of the set of multiple PCIs.

In some examples, the message is a first message, and the SSB resource subset indication component 1050 may be configured as or otherwise support a means for transmitting a second message indicating a subset of SSB resources of the set of multiple SSB resources that are configured for the UE to measure and report on.

In some examples, the SSB report component 1065 may be configured as or otherwise support a means for receiving, from the UE, a report indicating a SSB with a highest measured quality, the SSB transmitted in the subset of SSB resources.

In some examples, the handover procedure component 1070 may be configured as or otherwise support a means for performing a handover procedure with the UE and a neighbor base station of the one or more neighbor base stations based on the neighbor base station being associated with the SSB with the highest measured quality, the handover procedure a lower layer handover procedure.

In some examples, the lower layer handover procedure includes physical layer signaling, or MAC signaling, or both.

In some examples, the SSB report component 1065 may be configured as or otherwise support a means for receiving, from the UE, a report indicating a SSB with a highest measured quality, the SSB not transmitted in the subset of SSB resources.

In some examples, the handover procedure component 1070 may be configured as or otherwise support a means for performing a handover procedure with the UE and a neighbor base station of the one or more neighbor base stations based on the neighbor base station being associated with the SSB with the highest measured quality, the handover procedure a lower layer handover procedure.

In some examples, the lower layer handover procedure includes physical layer signaling, or MAC signaling, or both.

In some examples, the first portion of resources associated with the base station and the one or more additional portions of resources with respective ones of the one or more neighbor base stations partially overlap in a time-domain.

In some examples, to support transmitting the message indicating the set of multiple SSB resources, the SSB resource set indication component 1025 may be configured as or otherwise support a means for transmitting an RRC signal including the message indicating the set of multiple SSB resources.

Figure 11:
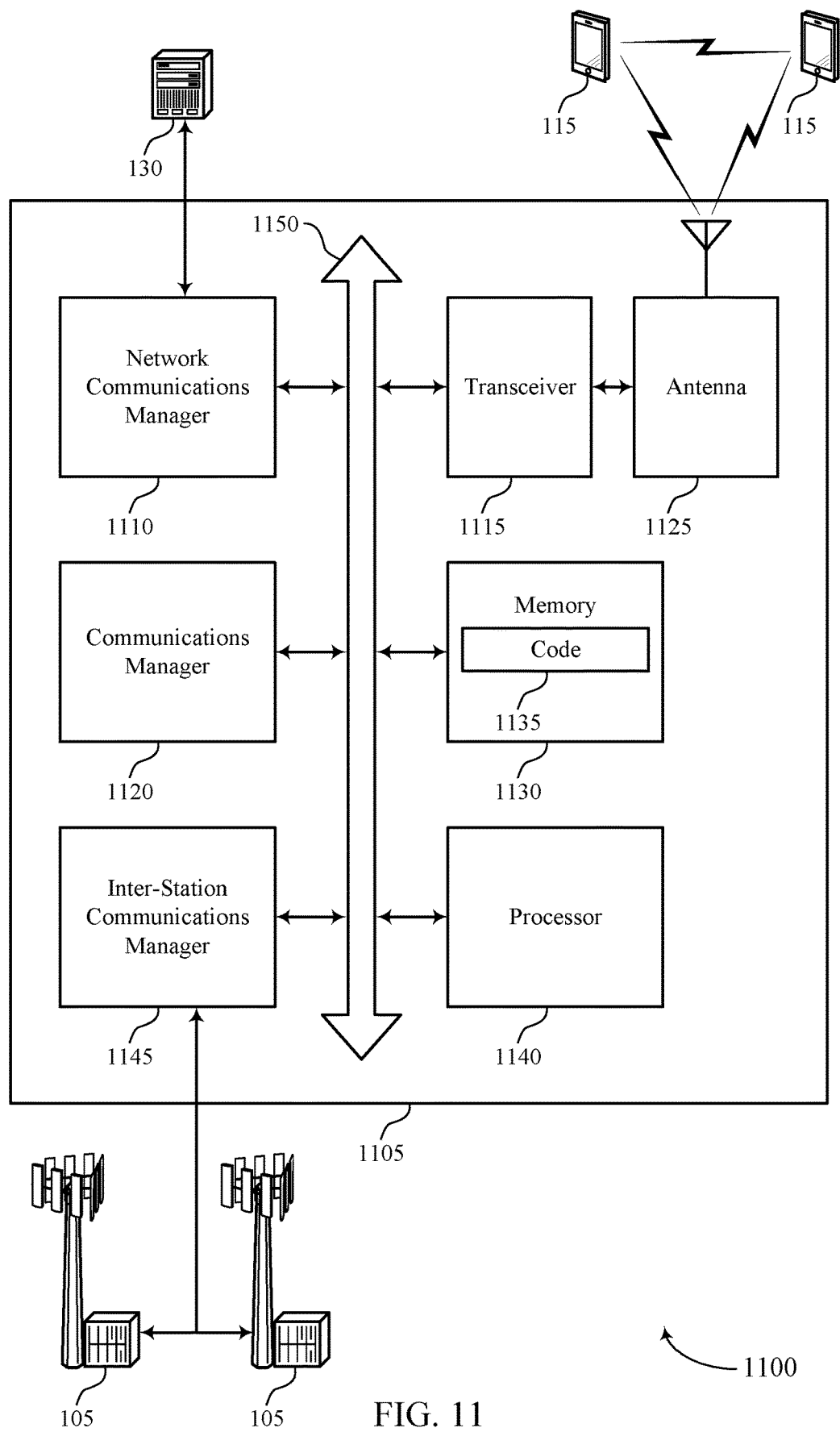
FIG. 11 shows a diagram of a system including a device that supports techniques for channel measurement and reporting for lower layer mobility in accordance with aspects of the present disclosure.

FIG. 11 shows a diagram of a system 1100 including a device 1105 that supports techniques for channel measurement and reporting for lower layer mobility in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for channel measurement and reporting for lower layer mobility). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, a message indicating a set of multiple SSB resources reserved for synchronization signal transmission by the base station and by one or more neighbor base stations to the UE, the set of multiple SSB resources including a first portion of resources associated with the base station and one or more additional portions of resources associated with respective ones of the one or more neighbor base stations. The communications manager 1120 may be configured as or otherwise support a means for identifying two or more symbols which are adjacent to consecutive SSB resources of the set of multiple SSB resources. The communications manager 1120 may be configured as or otherwise support a means for excluding the two or more symbols from being used for communications between the UE and the base station based on the two or more symbols being adjacent to the consecutive SSB resources. The communications manager 1120 may be configured as or otherwise support a means for communicating with the UE on symbols other than the two or more symbols.

By including or configuring the communications manager 1120 in accordance with examples as described herein, the device 1105 may support techniques for improved communication reliability, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for channel measurement and reporting for lower layer mobility as described herein, or the processor 1140 and the memory 1130 may be otherwise configured to perform or support such operations.

Figure 12:
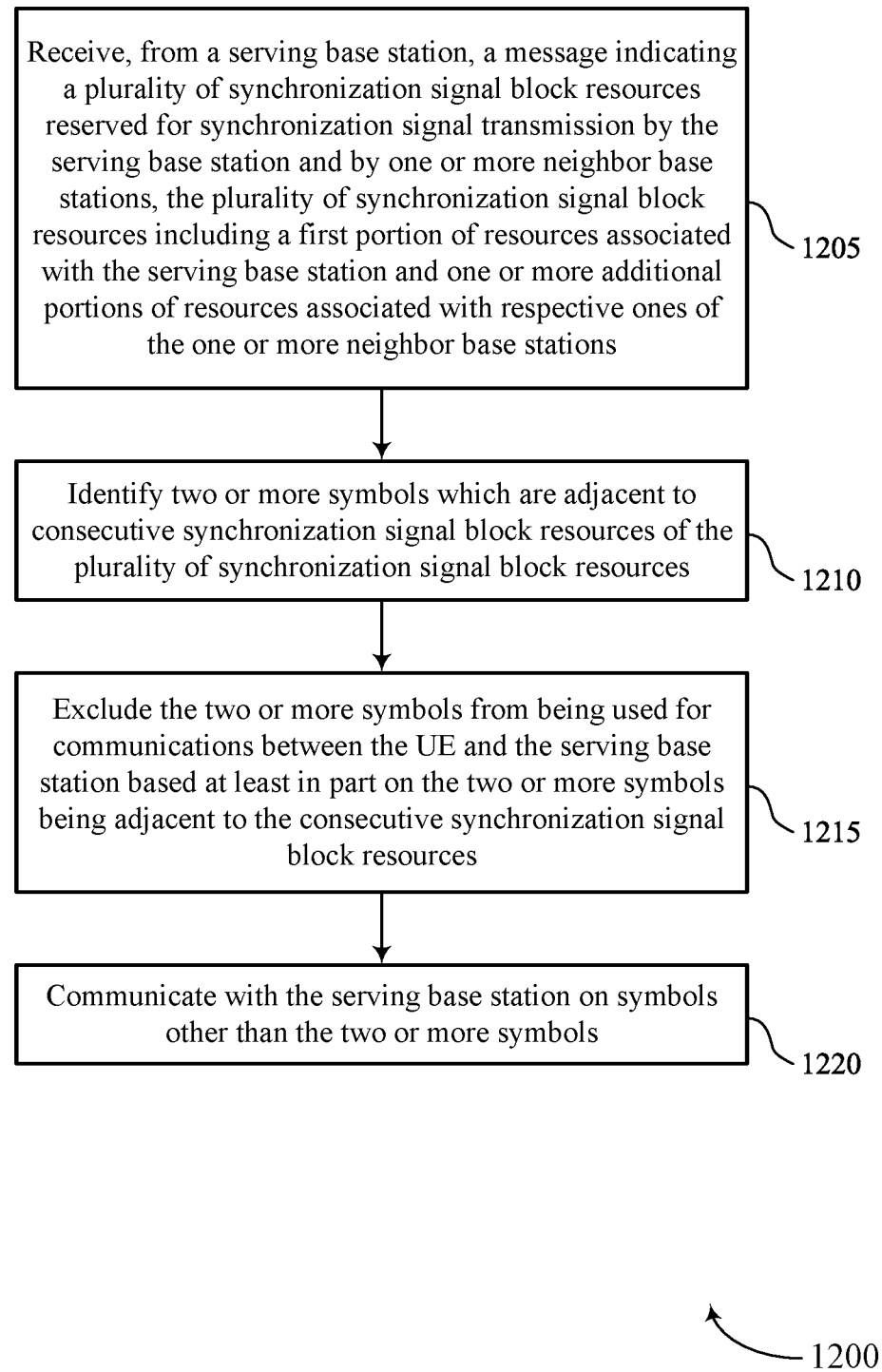
FIGS. 12 through 15 show flowcharts illustrating methods that support techniques for channel measurement and reporting for lower layer mobility in accordance with aspects of the present disclosure.

FIG. 12 shows a flowchart illustrating a method 1200 that supports techniques for channel measurement and reporting for lower layer mobility in accordance with aspects of the present disclosure. The operations of the method 1200 may be implemented by a UE or components of the UE as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The operations of 1205 may be performed in accordance with examples as disclosed herein. In some examples, aspects of the operations of 1205 may be performed by an SSB resource set indication manager 625 as described with reference to FIG. 6.

At 1210, the method may include identifying two or more symbols which are adjacent to consecutive SSB resources of the set of multiple SSB resources. The operations of 1210 may be performed in accordance with examples as disclosed herein. In some examples, aspects of the operations of 1210 may be performed by an adjacent symbol identification manager 630 as described with reference to FIG. 6.

At 1215, the method may include excluding the two or more symbols from being used for communications between the UE and the serving base station based on the two or more symbols being adjacent to the consecutive SSB resources. The operations of 1215 may be performed in accordance with examples as disclosed herein. In some examples, aspects of the operations of 1215 may be performed by an adjacent symbol exclusion manager 635 as described with reference to FIG. 6.

At 1220, the method may include communicating with the serving base station on symbols other than the two or more symbols. The operations of 1220 may be performed in accordance with examples as disclosed herein. In some examples, aspects of the operations of 1220 may be performed by a serving base station communications manager 640 as described with reference to FIG. 6.

Figure 13:
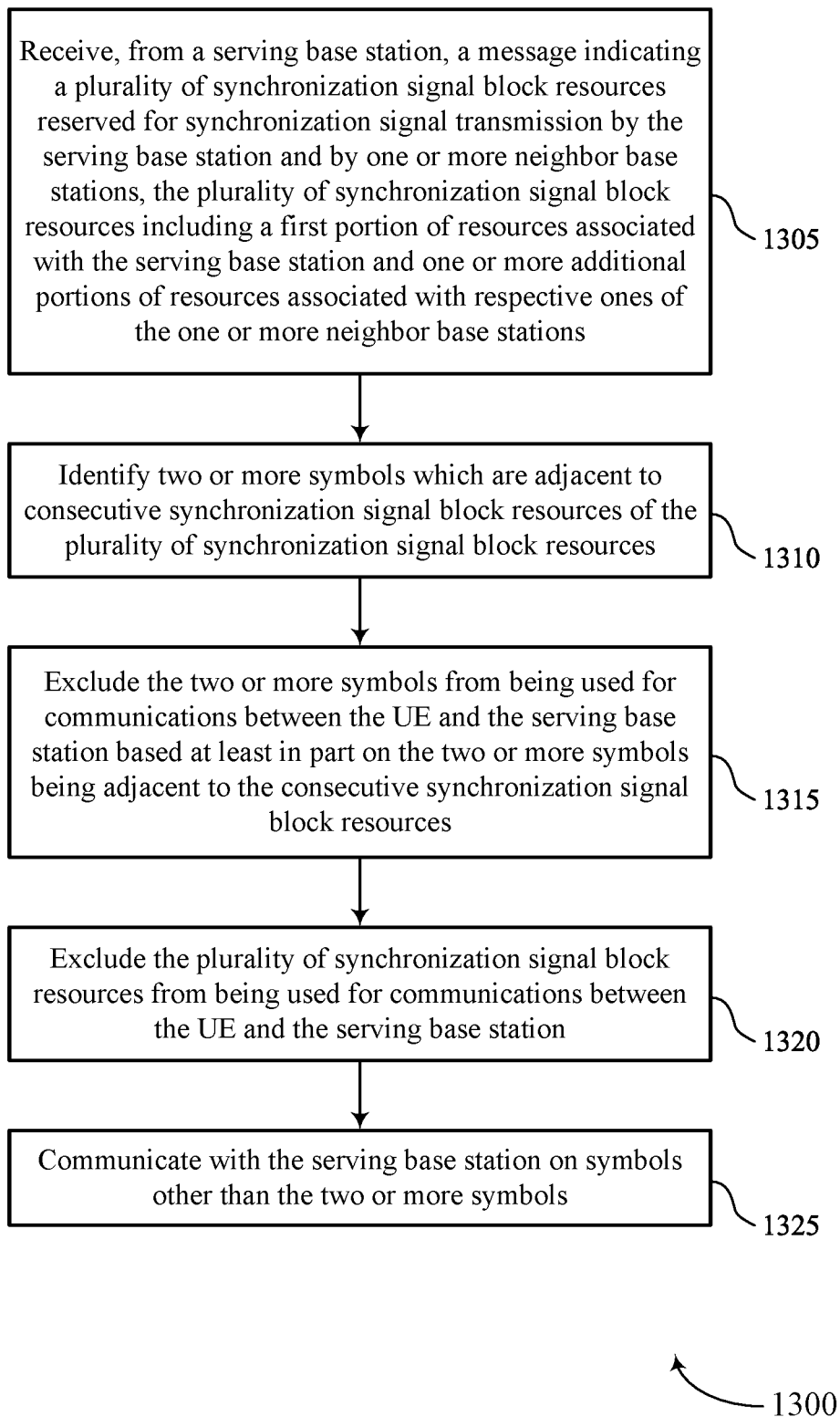

FIG. 13 shows a flowchart illustrating a method 1300 that supports techniques for channel measurement and reporting for lower layer mobility in accordance with aspects of the present disclosure. The operations of the method 1300 may be implemented by a UE or components of the UE as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The operations of 1305 may be performed in accordance with examples as disclosed herein. In some examples, aspects of the operations of 1305 may be performed by an SSB resource set indication manager 625 as described with reference to FIG. 6.

At 1310, the method may include identifying two or more symbols which are adjacent to consecutive SSB resources of the set of multiple SSB resources. The operations of 1310 may be performed in accordance with examples as disclosed herein. In some examples, aspects of the operations of 1310 may be performed by an adjacent symbol identification manager 630 as described with reference to FIG. 6.

At 1315, the method may include excluding the two or more symbols from being used for communications between the UE and the serving base station based on the two or more symbols being adjacent to the consecutive SSB resources. The operations of 1315 may be performed in accordance with examples as disclosed herein. In some examples, aspects of the operations of 1315 may be performed by an adjacent symbol exclusion manager 635 as described with reference to FIG. 6.

At 1320, the method may include excluding the set of multiple SSB resources from being used for communications between the UE and the serving base station. The operations of 1320 may be performed in accordance with examples as disclosed herein. In some examples, aspects of the operations of 1320 may be performed by an SSB resource set exclusion manager 645 as described with reference to FIG. 6.

At 1325, the method may include communicating with the serving base station on symbols other than the two or more symbols. The operations of 1325 may be performed in accordance with examples as disclosed herein. In some examples, aspects of the operations of 1325 may be performed by a serving base station communications manager 640 as described with reference to FIG. 6.

Figure 14:
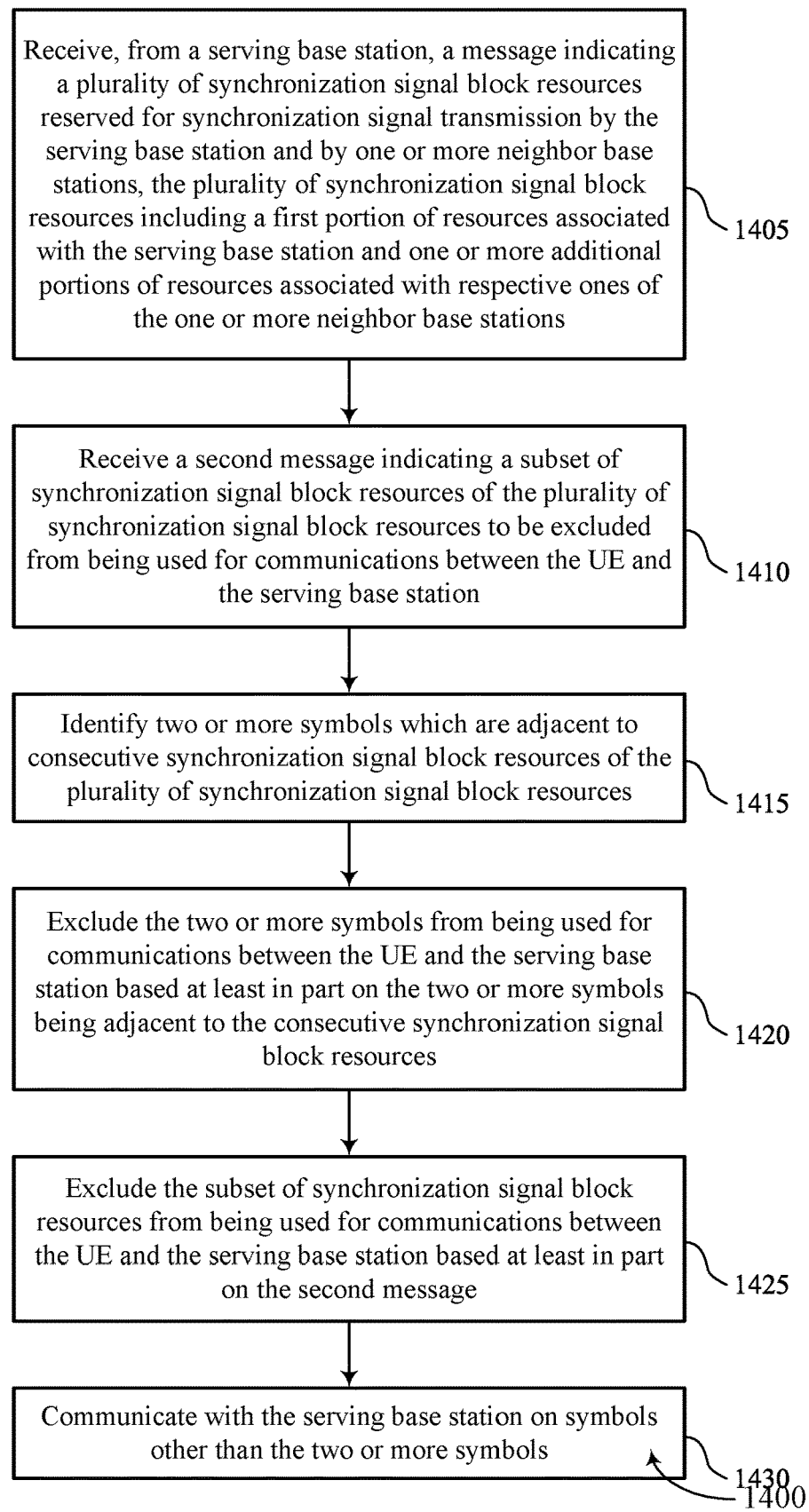

FIG. 14 shows a flowchart illustrating a method 1400 that supports techniques for channel measurement and reporting for lower layer mobility in accordance with aspects of the present disclosure. The operations of the method 1400 may be implemented by a UE or components of the UE as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a serving base station, a message indicating a set of multiple SSB resources reserved for synchronization signal transmission by the serving base station and by one or more neighbor base stations, the set of multiple SSB resources including a first portion of resources associated with the serving base station and one or more additional portions of resources associated with respective ones of the one or more neighbor base stations. The operations of 1405 may be performed in accordance with examples as disclosed herein. In some examples, aspects of the operations of 1405 may be performed by an SSB resource set indication manager 625 as described with reference to FIG. 6.

At 1410, the method may include receiving a second message indicating a subset of SSB resources of the set of multiple SSB resources to be excluded from being used for communications between the UE and the serving base station. The operations of 1410 may be performed in accordance with examples as disclosed herein. In some examples, aspects of the operations of 1410 may be performed by an SSB resource subset indication manager 650 as described with reference to FIG. 6.

At 1415, the method may include identifying two or more symbols which are adjacent to consecutive SSB resources of the set of multiple SSB resources. The operations of 1415 may be performed in accordance with examples as disclosed herein. In some examples, aspects of the operations of 1415 may be performed by an adjacent symbol identification manager 630 as described with reference to FIG. 6.

At 1420, the method may include excluding the two or more symbols from being used for communications between the UE and the serving base station based on the two or more symbols being adjacent to the consecutive SSB resources. The operations of 1420 may be performed in accordance with examples as disclosed herein. In some examples, aspects of the operations of 1420 may be performed by an adjacent symbol exclusion manager 635 as described with reference to FIG. 6.

At 1425, the method may include excluding the subset of SSB resources from being used for communications between the UE and the serving base station based on the second message. The operations of 1425 may be performed in accordance with examples as disclosed herein. In some examples, aspects of the operations of 1425 may be performed by an SSB resource subset exclusion manager 655 as described with reference to FIG. 6.

At 1430, the method may include communicating with the serving base station on symbols other than the two or more symbols. The operations of 1430 may be performed in accordance with examples as disclosed herein. In some examples, aspects of the operations of 1430 may be performed by a serving base station communications manager 640 as described with reference to FIG. 6.

Figure 15:
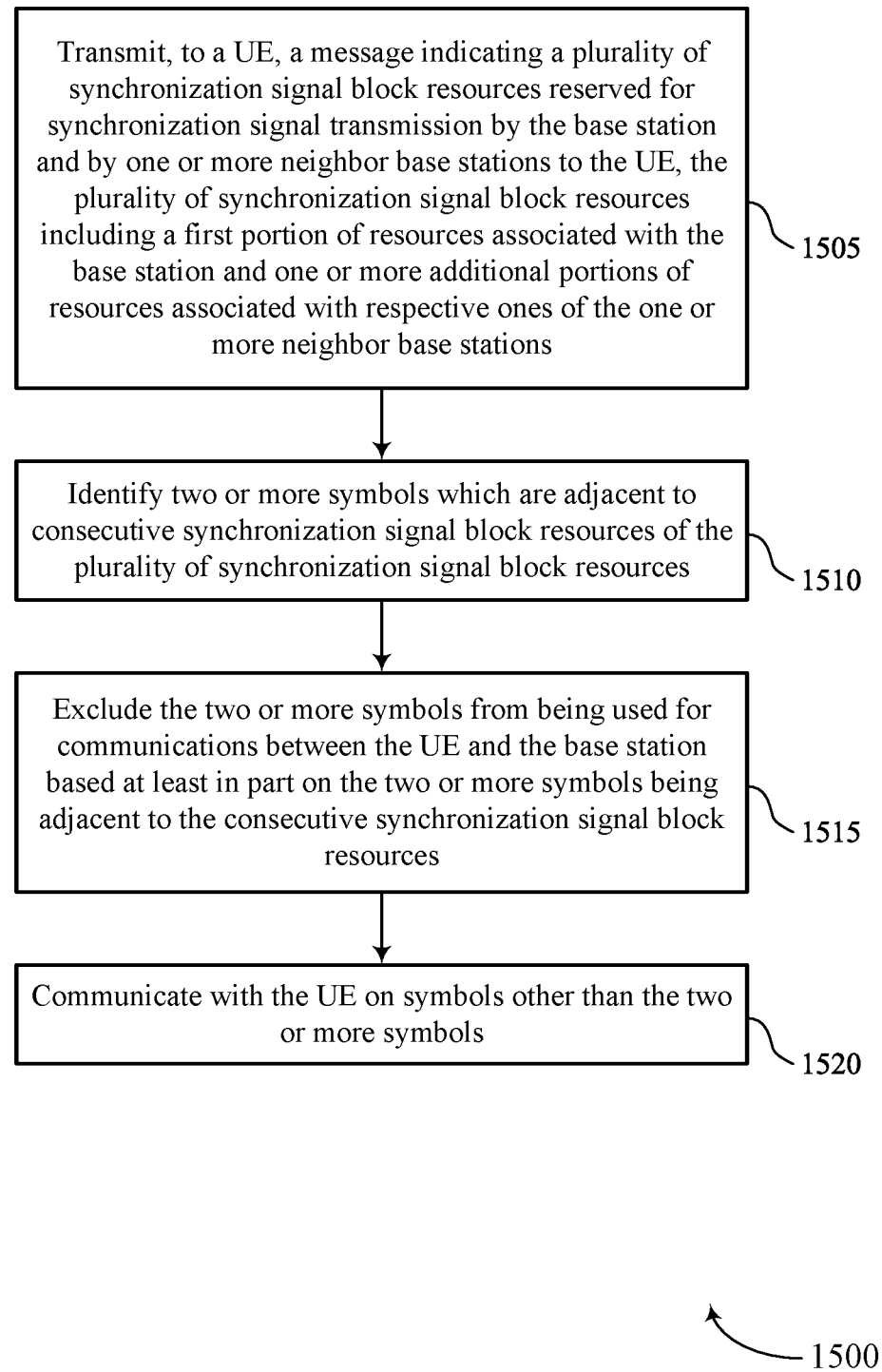

FIG. 15 shows a flowchart illustrating a method 1500 that supports techniques for channel measurement and reporting for lower layer mobility in accordance with aspects of the present disclosure. The operations of the method 1500 may be implemented by a base station or components of the UE as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a message indicating a set of multiple SSB resources reserved for synchronization signal transmission by the base station and by one or more neighbor base stations to the UE, the set of multiple SSB resources including a first portion of resources associated with the base station and one or more additional portions of resources associated with respective ones of the one or more neighbor base stations. The operations of 1505 may be performed in accordance with examples as disclosed herein. In some examples, aspects of the operations of 1505 may be performed by an SSB resource set indication component 1025 as described with reference to FIG. 10.

At 1510, the method may include identifying two or more symbols which are adjacent to consecutive SSB resources of the set of multiple SSB resources. The operations of 1510 may be performed in accordance with examples as disclosed herein. In some examples, aspects of the operations of 1510 may be performed by an adjacent symbol identification component 1030 as described with reference to FIG. 10.

At 1515, the method may include excluding the two or more symbols from being used for communications between the UE and the base station based on the two or more symbols being adjacent to the consecutive SSB resources. The operations of 1515 may be performed in accordance with examples as disclosed herein. In some examples, aspects of the operations of 1515 may be performed by an adjacent symbol exclusion component 1035 as described with reference to FIG. 10.

At 1520, the method may include communicating with the UE on symbols other than the two or more symbols. The operations of 1520 may be performed in accordance with examples as disclosed herein. In some examples, aspects of the operations of 1520 may be performed by a non-excluded symbols communication component 1040 as described with reference to FIG. 10.

The following aspects are given by way of illustration. Examples of the following aspects may be combined with examples or embodiments shown or discussed in relation to the figures or elsewhere herein.

Aspect 1: A method for wireless communications at a UE, comprising: receiving, from a serving base station, a message indicating a plurality of synchronization signal block resources reserved for synchronization signal transmission by the serving base station and by one or more neighbor base stations, the plurality of synchronization signal block resources including a first portion of resources associated with the serving base station and one or more additional portions of resources associated with respective ones of the one or more neighbor base stations; identifying two or more symbols which are adjacent to consecutive synchronization signal block resources of the plurality of synchronization signal block resources; excluding the two or more symbols from being used for communications between the UE and the serving base station based at least in part on the two or more symbols being adjacent to the consecutive synchronization signal block resources; and communicating with the serving base station on symbols other than the two or more symbols.

Aspect 2: The method of aspect 1, further comprising: excluding the plurality of synchronization signal block resources from being used for communications between the UE and the serving base station.

Aspect 3: The method of aspect 2, wherein excluding the two or more symbols further comprises: excluding an adjacent symbol prior to each synchronization signal block resource of the plurality of synchronization signal block resources and an adjacent symbol after each synchronization signal block resource of the plurality of synchronization signal block resources from being used for communications between the UE and the serving base station.

Aspect 4: The method of any of aspects 1 through 3, wherein the message is a first message, the method further comprising: receiving a second message indicating a subset of synchronization signal block resources of the plurality of synchronization signal block resources to be excluded from being used for communications between the UE and the serving base station.

Aspect 5: The method of aspect 4, further comprising: excluding the subset of synchronization signal block resources from being used for communications between the UE and the serving base station based at least in part on the second message.

Aspect 6: The method of any of aspects 4 through 5, wherein excluding the two or more symbols further comprises: excluding an adjacent symbol prior to each synchronization signal block resource of the subset of synchronization signal block resources and an adjacent symbol after each synchronization signal block resource of the subset of synchronization signal block resources from being used for communications between the UE and the serving base station.

Aspect 7: The method of any of aspects 4 through 6, wherein receiving the first message indicating the plurality of synchronization signal block resources further comprises: receiving an indication of a plurality of physical cell identifiers, the indication comprising an association between each synchronization signal block resource of the plurality of synchronization signal block resources and a physical cell identifier of the plurality of physical cell identifiers.

Aspect 8: The method of aspect 7, wherein receiving the second message indicating the subset of synchronization signal block resources further comprises: receiving the second message, the second message comprising a subset of physical cell identifiers of the plurality of physical cell identifiers, the subset of physical cell identifiers implicitly indicating the subset of synchronization signal block resources based at least in part on the association.

Aspect 9: The method of any of aspects 7 through 8, wherein the serving base station is associated with a first physical cell identifier of the plurality of physical cell identifiers, and each neighbor base station of the one or more neighbor base stations is associated with a different physical cell identifier of the plurality of physical cell identifiers.

Aspect 10: The method of any of aspects 1 through 9, wherein the message is a first message, the method further comprising: receiving a second message indicating a subset of synchronization signal block resources of the plurality of synchronization signal block resources that are configured for the UE to measure and report on.

Aspect 11: The method of aspect 10, further comprising: monitoring for synchronization signal block transmissions in the subset of synchronization signal block resources based at least in part on the second message; measuring a quality of a plurality of synchronization signal block transmissions received by the UE during the subset of synchronization signal block resources; and transmitting, to the serving base station, a report indicating the synchronization signal block with a highest measured quality.

Aspect 12: The method of aspect 11, further comprising: initiating a handover procedure with the serving base station and a neighbor base station of the one or more neighbor base stations based at least in part on the neighbor base station being associated with the synchronization signal block with the highest measured quality, the handover procedure a lower layer handover procedure.

Aspect 13: The method of aspect 12, wherein the lower layer handover procedure comprises physical layer signaling, or medium access control signaling, or both.

Aspect 14: The method of any of aspects 10 through 13, further comprising: monitoring for synchronization signal block transmissions in the plurality of synchronization signal block resources based at least in part on the first message; measuring a quality of a plurality of synchronization signal block transmissions received by the UE during the plurality of synchronization signal block resources; determining a synchronization signal block transmission of the plurality of synchronization signal block transmissions with a highest measured quality, the synchronization signal block transmission with the highest measured quality not received in the subset of synchronization signal block resources; and transmitting, to the serving base station, a report indicating the synchronization signal block with the highest measured quality.

Aspect 15: The method of aspect 14, further comprising: initiating a handover procedure with the serving base station and a neighbor base station of the one or more neighbor base stations based at least in part on the neighbor base station being associated with the synchronization signal block with the highest measured quality, the handover procedure a lower layer handover procedure.

Aspect 16: The method of aspect 15, wherein the lower layer handover procedure comprises physical layer signaling, or medium access control signaling, or both.

Aspect 17: The method of any of aspects 1 through 16, wherein the first portion of resources associated with the serving base station and the one or more additional portions of resources with respective ones of the one or more neighbor base stations partially overlap in a time-domain.

Aspect 18: The method of any of aspects 1 through 17, wherein receiving the message indicating the plurality of synchronization signal block resources further comprises: receiving a radio resource control signal comprising the message indicating the plurality of synchronization signal block resources.

Aspect 19: A method for wireless communications at a base station, comprising: transmitting, to a UE, a message indicating a plurality of synchronization signal block resources reserved for synchronization signal transmission by the base station and by one or more neighbor base stations to the UE, the plurality of synchronization signal block resources including a first portion of resources associated with the base station and one or more additional portions of resources associated with respective ones of the one or more neighbor base stations; identifying two or more symbols which are adjacent to consecutive synchronization signal block resources of the plurality of synchronization signal block resources; excluding the two or more symbols from being used for communications between the UE and the base station based at least in part on the two or more symbols being adjacent to the consecutive synchronization signal block resources; and communicating with the UE on symbols other than the two or more symbols.

Aspect 20: The method of aspect 19, further comprising: excluding the plurality of synchronization signal block resources from being used for communications between the UE and the base station.

Aspect 21: The method of aspect 20, wherein excluding the two or more symbols further comprises: excluding an adjacent symbol prior to each synchronization signal block resource of the plurality of synchronization signal block resources and an adjacent symbol after each synchronization signal block resource of the plurality of synchronization signal block resources from being used for communications between the UE and serving base station.

Aspect 22: The method of any of aspects 19 through 21, wherein the message is a first message, the method further comprising: transmitting a second message indicating a subset of synchronization signal block resources of the plurality of synchronization signal block resources to be excluded from being used for communications between the UE and the base station.

Aspect 23: The method of aspect 22, further comprising: excluding the subset of synchronization signal block resources from being used for communications between the UE and the base station based at least in part on the second message.

Aspect 24: The method of any of aspects 22 through 23, wherein excluding the two or more symbols further comprises: excluding an adjacent symbol prior to each synchronization signal block resource of the subset of synchronization signal block resources and an adjacent symbol after each synchronization signal block resource of the subset of synchronization signal block resources from being used for communications between the UE and the base station.

Aspect 25: The method of any of aspects 22 through 24, wherein transmitting the first message indicating the plurality of synchronization signal block resources further comprises: transmitting an indication of a plurality of physical cell identifiers, the indication comprising an association between each synchronization signal block resource of the plurality of synchronization signal block resources and a physical cell identifier of the plurality of physical cell identifiers.

Aspect 26: The method of aspect 25, wherein receiving the second message indicating the subset of synchronization signal block resources further comprises: receiving the second message, the second message comprising a subset of physical cell identifiers of the plurality of physical cell identifiers, the subset of physical cell identifiers implicitly indicating the subset of synchronization signal block resources based at least in part on the association.

Aspect 27: The method of any of aspects 25 through 26, wherein the base station is associated with a first physical cell identifier of the plurality of physical cell identifiers, and each neighbor base station of the one or more neighbor base stations is associated with a different physical cell identifier of the plurality of physical cell identifiers.

Aspect 28: The method of any of aspects 19 through 27, wherein the message is a first message, the method further comprising: transmitting a second message indicating a subset of synchronization signal block resources of the plurality of synchronization signal block resources that are configured for the UE to measure and report on.

Aspect 29: The method of aspect 28, further comprising: receiving, from the UE, a report indicating a synchronization signal block with a highest measured quality, the synchronization signal block transmitted in the subset of synchronization signal block resources.

Aspect 30: The method of aspect 29, further comprising: performing a handover procedure with the UE and a neighbor base station of the one or more neighbor base stations based at least in part on the neighbor base station being associated with the synchronization signal block with the highest measured quality, the handover procedure a lower layer handover procedure.

Aspect 31: The method of aspect 30, wherein the lower layer handover procedure comprises physical layer signaling, or medium access control signaling, or both.

Aspect 32: The method of any of aspects 28 through 31, further comprising: receiving, from the UE, a report indicating a synchronization signal block with a highest measured quality, the synchronization signal block not transmitted in the subset of synchronization signal block resources.

Aspect 33: The method of aspect 32, further comprising: performing a handover procedure with the UE and a neighbor base station of the one or more neighbor base stations based at least in part on the neighbor base station being associated with the synchronization signal block with the highest measured quality, the handover procedure a lower layer handover procedure.

Aspect 34: The method of aspect 33, wherein the lower layer handover procedure comprises physical layer signaling, or medium access control signaling, or both.

Aspect 35: The method of any of aspects 19 through 34, wherein the first portion of resources associated with the base station and the one or more additional portions of resources with respective ones of the one or more neighbor base stations partially overlap in a time-domain.

Aspect 36: The method of any of aspects 19 through 35, wherein transmitting the message indicating the plurality of synchronization signal block resources further comprises: transmitting a radio resource control signal comprising the message indicating the plurality of synchronization signal block resources.

Aspect 37: An apparatus for wireless communications at a UE, comprising a processor; memory coupled with the processor; and instructions stored in the memory and executable by the processor to cause the apparatus to perform a method of any of aspects 1 through 18.

Aspect 38: An apparatus for wireless communications at a UE, comprising at least one means for performing a method of any of aspects 1 through 18.

Aspect 39: A non-transitory computer-readable medium storing code for wireless communications at a UE, the code comprising instructions executable by a processor to perform a method of any of aspects 1 through 18.

Aspect 40: An apparatus for wireless communications at a base station, comprising a processor; memory coupled with the processor; and instructions stored in the memory and executable by the processor to cause the apparatus to perform a method of any of aspects 19 through 36.

Aspect 41: An apparatus for wireless communications at a base station, comprising at least one means for performing a method of any of aspects 19 through 36.

Aspect 42: A non-transitory computer-readable medium storing code for wireless communications at a base station, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a serving base station, a message indicating a plurality of synchronization signal block resources reserved for synchronization signal transmission by the serving base station and by one or more neighbor base stations, the plurality of synchronization signal block resources including a first portion of resources associated with the serving base station and one or more additional portions of resources associated with respective ones of the one or more neighbor base stations;
   identifying two or more symbols which are adjacent to consecutive synchronization signal block resources of the plurality of synchronization signal block resources;
   excluding the two or more symbols from being used for communications between the UE and the serving base station based at least in part on the two or more symbols being adjacent to the consecutive synchronization signal block resources; and communicating with the serving base station on symbols other than the two or more symbols.

2. The method of claim 1, further comprising:
excluding the plurality of synchronization signal block resources from being used for communications between the UE and the serving base station.

3. The method of claim 2, wherein excluding the two or more symbols further comprises:
excluding an adjacent symbol prior to each synchronization signal block resource of the plurality of synchronization signal block resources and an adjacent symbol after each synchronization signal block resource of the plurality of synchronization signal block resources from being used for communications between the UE and the serving base station.

4. The method of claim 1, wherein the message is a first message, the method further comprising:
receiving a second message indicating a subset of synchronization signal block resources of the plurality of synchronization signal block resources to be excluded from being used for communications between the UE and the serving base station.

5. The method of claim 4, further comprising:
excluding the subset of synchronization signal block resources from being used for communications between the UE and the serving base station based at least in part on the second message.

6. The method of claim 4, wherein excluding the two or more symbols further comprises:
excluding an adjacent symbol prior to each synchronization signal block resource of the subset of synchronization signal block resources and an adjacent symbol after each synchronization signal block resource of the subset of synchronization signal block resources from being used for communications between the UE and the serving base station.

7. The method of claim 4, wherein receiving the first message indicating the plurality of synchronization signal block resources further comprises:
receiving an indication of a plurality of physical cell identifiers, the indication comprising an association between each synchronization signal block resource of the plurality of synchronization signal block resources and a physical cell identifier of the plurality of physical cell identifiers.

8. The method of claim 7, wherein receiving the second message indicating the subset of synchronization signal block resources further comprises:
receiving the second message, the second message comprising a subset of physical cell identifiers of the plurality of physical cell identifiers, the subset of physical cell identifiers implicitly indicating the subset of synchronization signal block resources based at least in part on the association.

9. The method of claim 7, wherein the serving base station is associated with a first physical cell identifier of the plurality of physical cell identifiers, and each neighbor base station of the one or more neighbor base stations is associated with a different physical cell identifier of the plurality of physical cell identifiers.

10. The method of claim 1, wherein the message is a first message, the method further comprising:
receiving a second message indicating a subset of synchronization signal block resources of the plurality of synchronization signal block resources that are configured for the UE to measure and report on.

11. The method of claim 10, further comprising:
monitoring for synchronization signal block transmissions in the subset of synchronization signal block resources based at least in part on the second message;
measuring a quality of a plurality of synchronization signal block transmissions received by the UE during the subset of synchronization signal block resources; and
transmitting, to the serving base station, a report indicating the synchronization signal block with a highest measured quality.

12. The method of claim 11, further comprising:
initiating a handover procedure with the serving base station and a neighbor base station of the one or more neighbor base stations based at least in part on the neighbor base station being associated with the synchronization signal block with the highest measured quality, the handover procedure a lower layer handover procedure.

13. The method of claim 10, further comprising:
monitoring for synchronization signal block transmissions in the plurality of synchronization signal block resources based at least in part on the first message;
measuring a quality of a plurality of synchronization signal block transmissions received by the UE during the plurality of synchronization signal block resources;
determining a synchronization signal block transmission of the plurality of synchronization signal block transmissions with a highest measured quality, the synchronization signal block transmission with the highest measured quality not received in the subset of synchronization signal block resources; and
transmitting, to the serving base station, a report indicating the synchronization signal block with the highest measured quality.

14. The method of claim 13, further comprising:
initiating a handover procedure with the serving base station and a neighbor base station of the one or more neighbor base stations based at least in part on the neighbor base station being associated with the synchronization signal block with the highest measured quality, the handover procedure a lower layer handover procedure.

15. An apparatus for wireless communications at a user equipment (UE), comprising:
a processor;
memory coupled with the processor; and
instructions stored in the memory and executable by the processor to cause the apparatus to:
receive, from a serving base station, a message indicating a plurality of synchronization signal block resources reserved for synchronization signal transmission by the serving base station and by one or more neighbor base stations, the plurality of synchronization signal block resources including a first portion of resources associated with the serving base station and one or more additional portions of resources associated with respective ones of the one or more neighbor base stations;
identify two or more symbols which are adjacent to consecutive synchronization signal block resources of the plurality of synchronization signal block resources;
exclude the two or more symbols from being used for communications between the UE and the serving base station based at least in part on the two or more symbols being adjacent to the consecutive synchronization signal block resources; and communicate with the serving base station on symbols other than the two or more symbols.

16. The apparatus of claim 15, wherein the instructions are further executable by the processor to cause the apparatus to:

exclude the plurality of synchronization signal block resources from being used for communications between the UE and the serving base station.

17. The apparatus of claim 16, wherein the instructions to exclude the two or more symbols are further executable by the processor to cause the apparatus to:

exclude an adjacent symbol prior to each synchronization signal block resource of the plurality of synchronization signal block resources and an adjacent symbol after each synchronization signal block resource of the plurality of synchronization signal block resources from being used for communications between the UE and the serving base station.

18. The apparatus of claim 15, wherein the message is a first message, and the instructions are further executable by the processor to cause the apparatus to:

receive a second message indicating a subset of synchronization signal block resources of the plurality of synchronization signal block resources to be excluded from being used for communications between the UE and the serving base station.

19. The apparatus of claim 18, wherein the instructions are further executable by the processor to cause the apparatus to:

exclude the subset of synchronization signal block resources from being used for communications between the UE and the serving base station based at least in part on the second message.

20. The apparatus of claim 18, wherein the instructions to exclude the two or more symbols are further executable by the processor to cause the apparatus to:

exclude an adjacent symbol prior to each synchronization signal block resource of the subset of synchronization signal block resources and an adjacent symbol after each synchronization signal block resource of the subset of synchronization signal block resources from being used for communications between the UE and the serving base station.

21. The apparatus of claim 18, wherein the instructions to receive the first message indicating the plurality of synchronization signal block resources are further executable by the processor to cause the apparatus to:

receive an indication of a plurality of physical cell identifiers, the indication comprising an association between each synchronization signal block resource of the plurality of synchronization signal block resources and a physical cell identifier of the plurality of physical cell identifiers.

22. The apparatus of claim 21, wherein the instructions to receive the second message indicating the subset of synchronization signal block resources are further executable by the processor to cause the apparatus to:

receive the second message, the second message comprising a subset of physical cell identifiers of the plurality of physical cell identifiers, the subset of physical cell identifiers implicitly indicating the subset of synchronization signal block resources based at least in part on the association.

23. The apparatus of claim 21, wherein the serving base station is associated with a first physical cell identifier of the plurality of physical cell identifiers, and each neighbor base station of the one or more neighbor base stations is associated with a different physical cell identifier of the plurality of physical cell identifiers.

24. The apparatus of claim 15, wherein the message is a first message, and the instructions are further executable by the processor to cause the apparatus to:

receive a second message indicating a subset of synchronization signal block resources of the plurality of synchronization signal block resources that are configured for the UE to measure and report on.

25. The apparatus of claim 24, wherein the instructions are further executable by the processor to cause the apparatus to:

monitor for synchronization signal block transmissions in the subset of synchronization signal block resources based at least in part on the second message;

measure a quality of a plurality of synchronization signal block transmissions received by the UE during the subset of synchronization signal block resources; and transmit, to the serving base station, a report indicating the synchronization signal block with a highest measured quality.

26. The apparatus of claim 25, wherein the instructions are further executable by the processor to cause the apparatus to:

initiate a handover procedure with the serving base station and a neighbor base station of the one or more neighbor base stations based at least in part on the neighbor base station being associated with the synchronization signal block with the highest measured quality, the handover procedure a lower layer handover procedure.

27. The apparatus of claim 24, wherein the instructions are further executable by the processor to cause the apparatus to:

monitor for synchronization signal block transmissions in the plurality of synchronization signal block resources based at least in part on the first message;

measure a quality of a plurality of synchronization signal block transmissions received by the UE during the plurality of synchronization signal block resources;

determine a synchronization signal block transmission of the plurality of synchronization signal block transmissions with a highest measured quality, the synchronization signal block transmission with the highest measured quality not received in the subset of synchronization signal block resources; and transmit, to the serving base station, a report indicating the synchronization signal block with the highest measured quality.

28. The apparatus of claim 27, wherein the instructions are further executable by the processor to cause the apparatus to:

initiate a handover procedure with the serving base station and a neighbor base station of the one or more neighbor base stations based at least in part on the neighbor base station being associated with the synchronization signal block with the highest measured quality, the handover procedure a lower layer handover procedure.

29. An apparatus for wireless communications at a user equipment (UE), comprising:

means for receiving, from a serving base station, a message indicating a plurality of synchronization signal block resources reserved for synchronization signal transmission by the serving base station and by one or more neighbor base stations, the plurality of synchronization signal block resources including a first portion of resources associated with the serving base station and one or more additional portions of resources associated with respective ones of the one or more neighbor base stations;

means for identifying two or more symbols which are adjacent to consecutive synchronization signal block resources of the plurality of synchronization signal block resources;

means for excluding the two or more symbols from being used for communications between the UE and the serving base station based at least in part on the two or more symbols being adjacent to the consecutive synchronization signal block resources; and means for communicating with the serving base station on symbols other than the two or more symbols.

30. A non-transitory computer-readable medium storing code for wireless communications at a user equipment (UE), the code comprising instructions executable by a processor to:

receive, from a serving base station, a message indicating a plurality of synchronization signal block resources reserved for synchronization signal transmission by the serving base station and by one or more neighbor base stations, the plurality of synchronization signal block resources including a first portion of resources associated with the serving base station and one or more additional portions of resources associated with respective ones of the one or more neighbor base stations;

identify two or more symbols which are adjacent to consecutive synchronization signal block resources of the plurality of synchronization signal block resources;

exclude the two or more symbols from being used for communications between the UE and the serving base station based at least in part on the two or more symbols being adjacent to the consecutive synchronization signal block resources; and communicate with the serving base station on symbols other than the two or more symbols.

* * * * *